United States Patent
Xu et al.

(10) Patent No.: US 10,548,125 B2
(45) Date of Patent: Jan. 28, 2020

(54) D2D RESOURCE ALLOCATION METHOD, DEVICE, AND SYSTEM

(71) Applicant: HUAWEI TECHNOLOGIES CO., LTD., Shenzhen, Guangdong (CN)

(72) Inventors: Kai Xu, Beijing (CN); Xiaocui Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 12 days.

(21) Appl. No.: 15/760,134

(22) PCT Filed: Sep. 15, 2015

(86) PCT No.: PCT/CN2015/089596
§ 371 (c)(1),
(2) Date: Mar. 14, 2018

(87) PCT Pub. No.: WO2017/045117
PCT Pub. Date: Mar. 23, 2017

(65) Prior Publication Data
US 2019/0053203 A1    Feb. 14, 2019

(51) Int. Cl.
  *H04W 72/04* (2009.01)
  *H04W 88/04* (2009.01)
  *H04W 76/14* (2018.01)

(52) U.S. Cl.
  CPC ..... *H04W 72/042* (2013.01); *H04W 72/0446* (2013.01); *H04W 76/14* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 2015/0358985 A1 | 12/2015 | Chen et al. | |
| 2015/0365475 A1 | 12/2015 | Wang | |

(Continued)

FOREIGN PATENT DOCUMENTS

| | | |
|---|---|---|
| CN | 104284320 A | 1/2015 |
| CN | 104811892 A | 7/2015 |

(Continued)

OTHER PUBLICATIONS

XP050737598 R2-140395 CEWiT,"A common framework for D2D resource allocation for in-network and out-of-network coverage scenarios",3GPP TSG-RAN WG2 85 Feb. 10-14, 2014 Prague, Czech Republic,total 4 pages.

(Continued)

*Primary Examiner* — Alpus Hsu
*Assistant Examiner* — Camquyen Thai
(74) *Attorney, Agent, or Firm* — Fish & Richardson P.C.

(57) ABSTRACT

Embodiments of the present disclosure provide examples of D2D resource allocation methods, devices, and systems. One example method includes receiving, by first UE, a first message sent by second UE, where the first message is used to request to allocate a resource to the second UE, the first UE is UE in a network coverage area of a base station, and the second UE is UE out of the network coverage area of the base station. Resource indication information of a first resource allocated to the second UE is obtained by the first UE according to the first message. A second message is sent by the first UE to the second UE, where the second message carries the resource indication information, and the second UE sends data to the first UE by using the first resource according to the resource indication information.

11 Claims, 10 Drawing Sheets

(56) References Cited

U.S. PATENT DOCUMENTS

| | | | |
|---|---|---|---|
| 2016/0044666 A1* | 2/2016 | Shin | H04W 72/1278 370/336 |
| 2016/0073408 A1* | 3/2016 | Sartori | H04W 72/0453 370/329 |
| 2016/0338095 A1* | 11/2016 | Faurie | H04W 28/0278 |
| 2016/0345312 A1 | 11/2016 | Kim et al. | |
| 2017/0019886 A1* | 1/2017 | Patel | H04W 4/70 |
| 2017/0048829 A1* | 2/2017 | Kim | H04W 72/042 |
| 2017/0171837 A1 | 6/2017 | Chen et al. | |

FOREIGN PATENT DOCUMENTS

| | | |
|---|---|---|
| CN | 104869526 A | 8/2015 |
| CN | 104904297 A | 9/2015 |
| WO | 2015122629 A1 | 8/2015 |
| WO | 2016181095 A1 | 11/2016 |

OTHER PUBLICATIONS

XP050970906 R1-152467 Huawei, HiSilicon,"Discussion on resource assignment to support UE-to-Network relay",3GPP TSG RAN WG1 Meeting #81 Fukuoka, Japan, May 25-29, 2015,total 4 pages.

Extended European Search Report issued in European Application No. 15903808.2 dated Jun. 4, 2018, 10 pages.

3GPP TS 36.212 V12.5.0 (Jun. 2015),3rd Generation Partnership Project;Technical Specification Group Radio Access Network;Evolved Universal Terrestrial Radio Access (E-UTRA);Multiplexing and channel coding(Release 12),dated Jun. 2015,total 94 pages.

International Search Report issued in International Application No. PCT/CN2015/089596 dated Jun. 12, 2016, 13 pages.

Office Action issued in Chinese Application No. 201580082658.4 dated Aug. 15, 2019, 11 pages.

* cited by examiner

D2D RESOURCE ALLOCATION METHOD, DEVICE, AND SYSTEM

CROSS-REFERENCE TO RELATED APPLICATIONS

This application is a national stage of International Application No. PCT/CN2015/089596, filed on Sep. 15, 2015, which is hereby incorporated by reference in its entirety.

TECHNICAL FIELD

The present invention relates to the field of wireless communications, and in particular, to a device-to-device (Device to Device, D2D for short) resource allocation method, a device, and a system.

BACKGROUND

With continuous development of wireless communications system technologies, to implement communication, a D2D communication mode may be used in addition to a conventional cellular communication mode. In the cellular mode, user equipment (English: User Equipment, UE for short) communicates with another UE by using a base station. However, in the D2D communication mode, UE directly communicates with another UE. By means of D2D communication, not only a radio spectrum resource is saved, but also pressure on a core network is reduced. Therefore, a D2D technology becomes an important technology that is currently being standardized in the 3rd Generation Partnership Project (English: 3rd Generation Partnership Project, 3GPP for short) standard and that can be compatible with the 5th Generation (English: 5rd Generation, 5G for short).

Currently, enhanced D2D (English: Enhanced D2D, eD2D for short) is a topic being studied in the 3GPP Long Term Evolution (English: Long Term Evolution, LTE for short) system release.13 (English: Release.13, Rel.13 for short). In this topic, UE-to-network relays (English: UE-to-Network Relays) are an important research orientation. The UE-to-network relays are classified into two scenarios: communication (English: communication) and discovery (English: discovery). For the two scenarios, a specific communication process, resource allocation, data transmission, and the like need to be designed and studied correspondingly.

Currently, how to resolve a resource allocation problem of a link from UE out of network coverage (English: out of coverage) to UE in the network coverage (English: in coverage) becomes an urgent problem to be resolved.

SUMMARY

Embodiments of the present invention provide a D2D resource allocation method, a device, and a system, to resolve at least a resource allocation problem of a link from UE out of network coverage to UE in the network coverage.

To achieve the foregoing objective, the following technical solutions are used in the embodiments of the present invention.

According to a first aspect, a device-to-device D2D resource allocation method is provided, where the method includes:

receiving, by first user equipment UE, a first message sent by second UE, where the first message is used to request to allocate a resource to the second UE, the first UE is UE in a network coverage area of a base station, and the second UE is UE out of the network coverage area of the base station;

obtaining, by the first UE according to the first message, resource indication information of a first resource allocated to the second UE; and sending, by the first UE, a second message to the second UE, where the second message carries the resource indication information, and the second UE sends data to the first UE by using the first resource according to the resource indication information.

With reference to the first aspect, in a first possible implementation of the first aspect, the obtaining, by the first UE according to the first message, resource indication information of a first resource allocated to the second UE includes:

extending, by the first UE, a pre-stored sidelink control information SCI format 0 according to the first message, to obtain an extended SCI format 0, where the extended SCI format 0 is used to indicate the first resource allocated to the second UE.

With reference to the first possible implementation of the first aspect, in a second possible implementation of the first aspect, the extending, by the first UE, a pre-stored SCI format 0 according to the first message includes one or any combination of the following manners:

increasing, by the first UE, a frequency hopping flag field in the pre-stored SCI format 0 1 bit, where the 1 bit is used to indicate whether a frequency hopping flag in the extended SCI format 0 is the same as a frequency hopping flag in the pre-stored SCI format 0;

increasing, by the first UE, a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

increasing, by the first UE, a time resource pattern field in the pre-stored SCI format 0 by M bits, where the M bits are used to indicate an offset of the first resource on a time domain resource relative to the second resource, and M is a positive integer;

increasing, by the first UE, a modulation and coding scheme MCS field in the pre-stored SCI format 0 by Z bits, where the Z bits are used to indicate an offset of an MCS index of the first resource relative to an MSC index of the second resource, and Z is a positive integer; or increasing, by the first UE, a timing advance indication field in the pre-stored SCI format 0 by 1 bit, where the 1 bit is used to indicate whether the second UE uses a timing advance indication of the second UE or uses a timing advance indication of the first UE.

With reference to the first possible implementation of the first aspect or the second possible implementation of the first aspect, in a third possible implementation of the first aspect, the first resource has a fixed offset relative to the second resource indicated by the pre-stored SCI format 0.

With reference to the first aspect, in a fourth possible implementation of the first aspect, the obtaining, by the first UE according to the first message, resource indication information of a first resource allocated to the second UE includes:

sending, by the first UE, the first message to the base station; and receiving, by the first UE, the second message sent by the base station, where the second message carries the resource indication information of the first resource allocated by the base station to the second UE.

According to a second aspect, a device-to-device D2D resource allocation method is provided, where the method includes:

sending, by second user equipment UE, a first message to second UE, where the first message is used to request to allocate a resource to the second UE, the first UE is UE in a network coverage area of a base station, and the second UE is UE out of the network coverage area of the base station;

receiving, by the second UE, a second message sent by the first UE, where the second message carries resource indication information of a first resource allocated to the second UE; and sending, by the second UE, data to the first UE by using the first resource according to the resource indication information.

With reference to the second aspect, in a first possible implementation of the second aspect, the first resource is allocated to the second UE after the first UE extends a pre-stored sidelink control information SCI format 0 according to the first message.

With reference to the first possible implementation of the second aspect, in a second possible implementation of the second aspect, the first resource has a fixed offset relative to a second resource indicated by the pre-stored SCI format 0.

With reference to the second aspect, in a third possible implementation of the second aspect, the first resource is allocated by the base station to the second UE after the first UE sends the first message to the base station.

According to a third aspect, a device-to-device D2D resource allocation method is provided, where the method includes:

receiving, by a base station, a first message sent by first user equipment UE, where the first message is used to request to allocate a resource to the second UE, the first UE is UE in a network coverage area of the base station, and the second UE is UE out of the network coverage area of the base station;

allocating, by the base station, a first resource to the second UE according to the first message; and sending, by the base station, a second message to the first UE, where the second message carries resource indication information of the first resource, and the first UE sends the resource indication information to the second UE.

According to a fourth aspect, first user equipment UE is provided, where the first UE includes a receiving unit, a processing unit, and a sending unit, where the receiving unit is configured to receive a first message sent by second UE, where the first message is used to request to allocate a resource to the second UE, the first UE is UE in a network coverage area of a base station, and the second UE is UE out of the network coverage area of the base station;

the processing unit is configured to obtain, according to the first message, resource indication information of a first resource allocated to the second UE; and the sending unit is configured to send a second message to the second UE, where the second message carries the resource indication information, and the second UE sends data to the first UE by using the first resource according to the resource indication information.

With reference to the fourth aspect, in a first possible implementation of the fourth aspect, the processing unit is specifically configured to:

extend a pre-stored sidelink control information SCI format 0 according to the first message, to obtain an extended SCI format 0, where the extended SCI format 0 is used to indicate the first resource allocated to the second UE.

With reference to the first possible implementation of the fourth aspect, in a second possible implementation of the fourth aspect, the processing unit is specifically configured to execute one or any combination of the following manners:

increasing a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

increasing a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

increasing a time resource pattern field in the pre-stored SCI format 0 by M bits, where the M bits are used to indicate an offset of the first resource on a time domain resource relative to the second resource, and M is a positive integer;

increasing a modulation and coding scheme MCS field in the pre-stored SCI format 0 by Z bits, where the Z bits are used to indicate an offset of an MCS index of the first resource relative to an MSC index of the second resource, and Z is a positive integer; or increasing a timing advance indication field in the pre-stored SCI format 0 by 1 bit, where the 1 bit is used to indicate whether the second UE uses a timing advance indication of the second UE or uses a timing advance indication of the first UE.

With reference to the first possible implementation of the fourth aspect or the second possible implementation of the fourth aspect, in a third possible implementation of the fourth aspect, the first resource has a fixed offset relative to the second resource indicated by the pre-stored SCI format 0.

With reference to the fourth aspect, in a fourth possible implementation of the fourth aspect, the processing unit is specifically configured to:

send the first message to the base station; and receive the second message sent by the base station, where the second message carries the resource indication information of the first resource allocated by the base station to the second UE.

According to a fifth aspect, second user equipment UE is provided, where the second UE includes a sending unit and a receiving unit, where the sending unit is configured to send a first message to second UE, where the first message is used to request to allocate a resource to the second UE, the first UE is UE in a network coverage area of a base station, and the second UE is UE out of the network coverage area of the base station;

the receiving unit is configured to receive a second message sent by the first UE, where the second message carries resource indication information of a first resource allocated to the second UE; and the sending unit is further configured to send data to the first UE by using the first resource according to the resource indication information.

With reference to the fifth aspect, in a first possible implementation of the fifth aspect, the first resource is allocated to the second UE after the first UE extends a pre-stored sidelink control information SCI format 0 according to the first message.

With reference to the first possible implementation of the fifth aspect, in a second possible implementation of the fifth aspect, the first resource has a fixed offset relative to a second resource indicated by the pre-stored SCI format 0.

With reference to the fifth aspect, in a third possible implementation of the fifth aspect, the first resource is allocated by the base station to the second UE after the first UE sends the first message to the base station.

According to a sixth aspect, a base station is provided, where the base station includes a receiving unit, a processing unit, and a sending unit, where the receiving unit is configured to receive a first message sent by first user equipment UE, where the first message is used to request to allocate a resource to the second UE, the first UE is UE in a network coverage area of the base station, and the second UE is UE out of the network coverage area of the base station;

the processing unit is configured to allocate a first resource to the second UE according to the first message; and the sending unit is configured to send a second message to the first UE, where the second message carries resource indication information of the first resource, and the first UE sends the resource indication information to the second UE.

According to a seventh aspect, first user equipment UE is provided, where the first UE includes a processor, a first interface circuit, a second interface circuit, a memory, and a bus, and the processor, the first interface circuit, the second interface circuit, and the memory are connected and complete mutual communication by using the bus;

the first interface circuit is configured to receive a first message sent by second UE, where the first message is used to request to allocate a resource to the second UE, the first UE is UE in a network coverage area of a base station, and the second UE is UE out of the network coverage area of the base station;

the processor is configured to obtain, according to the first message, resource indication information of a first resource allocated to the second UE; and the second interface circuit is configured to send a second message to the second UE, where the second message carries the resource indication information, and the second UE sends data to the first UE by using the first resource according to the resource indication information.

With reference to the seventh aspect, in a first possible implementation of the seventh aspect, the processor is specifically configured to:

extend a pre-stored sidelink control information SCI format 0 according to the first message, to obtain an extended SCI format 0, where the extended SCI format 0 is used to indicate the first resource allocated to the second UE.

With reference to the first possible implementation of the seventh aspect, in a second possible implementation of the seventh aspect, the processor is specifically configured to execute one or any combination of the following manners:

increasing a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

increasing a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

increasing a time resource pattern field in the pre-stored SCI format 0 by M bits, where the M bits are used to indicate an offset of the first resource on a time domain resource relative to the second resource, and M is a positive integer;

increasing a modulation and coding scheme MCS field in the pre-stored SCI format 0 by Z bits, where the Z bits are used to indicate an offset of an MCS index of the first resource relative to an MSC index of the second resource, and Z is a positive integer; or increasing a timing advance indication field in the pre-stored SCI format 0 by 1 bit, where the 1 bit is used to indicate whether the second UE uses a timing advance indication of the second UE or uses a timing advance indication of the first UE.

With reference to the first possible implementation of the seventh aspect or the second possible implementation of the seventh aspect, in a third possible implementation of the seventh aspect, the first resource has a fixed offset relative to the second resource indicated by the pre-stored SCI format 0.

With reference to the seventh aspect, in a fourth possible implementation of the seventh aspect, the processor is specifically configured to:

send the first message to the base station by using the second interface circuit; and receive, by using the first interface circuit, the second message sent by the base station, where the second message carries the resource indication information of the first resource allocated by the base station to the second UE.

According to an eighth aspect, second user equipment UE is provided, where the second UE includes a first interface circuit, a second interface circuit, a memory, and a bus, and the first interface circuit, the second interface circuit, and the memory are connected and complete mutual communication by using the bus;

the first interface circuit is configured to send a first message to second UE, where the first message is used to request to allocate a resource to the second UE, the first UE is UE in a network coverage area of a base station, and the second UE is UE out of the network coverage area of the base station;

the second interface circuit is configured to receive a second message sent by the first UE, where the second message carries resource indication information of a first resource allocated to the second UE; and the first interface circuit is further configured to send data to the first UE by using the first resource according to the resource indication information.

With reference to the eighth aspect, in a first possible implementation of the eighth aspect, the first resource is allocated to the second UE after the first UE extends a pre-stored sidelink control information SCI format 0 according to the first message.

With reference to the first possible implementation of the eighth aspect, in a second possible implementation of the eighth aspect, the first resource has a fixed offset relative to a second resource indicated by the pre-stored SCI format 0.

With reference to the eighth aspect, in a third possible implementation of the eighth aspect, the first resource is allocated by the base station to the second UE after the first UE sends the first message to the base station.

According to a ninth aspect, a base station is provided, where the base station includes a processor, a first interface circuit, a second interface circuit, a memory, and a bus, and the processor, the first interface circuit, the second interface circuit, and the memory are connected and complete mutual communication by using the bus;

the first interface circuit is configured to receive a first message sent by first user equipment UE, where the first message is used to request to allocate a resource to the second UE, the first UE is UE in a network coverage area of the base station, and the second UE is UE out of the network coverage area of the base station;

the processor is configured to allocate a first resource to the second UE according to the first message; and the second interface circuit is configured to send a second message to the first UE, where the second message carries resource indication information of the first resource, and the first UE sends the resource indication information to the second UE.

According to a tenth aspect, a device-to-device D2D communications system is provided, where the D2D communications system includes a base station, the first user equipment UE according to any one of the fourth aspect to the third possible implementation of the fourth aspect, and the second UE according to any one of the fifth aspect to the second possible implementation of the fifth aspect; or the D2D communications system includes a base station, the first user equipment UE according to any one of the seventh aspect to the third possible implementation of the seventh aspect, and the second UE according to any one of the eighth aspect to the second possible implementation of the eighth aspect.

According to an eleventh aspect, a device-to-device D2D communications system is provided, where the D2D communications system includes the first user equipment UE according to the fourth possible implementation of the fourth aspect, the second UE according to the third possible implementation of the fifth aspect, and the base station according to the sixth aspect; or the D2D communications system includes the first user equipment UE according to the fourth possible implementation of the seventh aspect, the second UE according to the third possible implementation of the eighth aspect, and the base station according to the ninth aspect.

Based on the D2D resource allocation method, the device, and the system provided in the embodiments of the present invention, in the embodiments of the present invention, after receiving the first message that is sent by the second UE and that is used to request to allocate a resource to the second UE, the first UE obtains, according to the first message, the resource indication information of the first resource allocated to the second UE, and then the first UE sends the second message to the second UE, where the second message carries the resource indication information of the first resource. In this way, after receiving the second message, the second UE may send the data to the first UE by using the first resource according to the resource indication information. The first UE is UE in the network coverage area of the base station, and the second UE is UE out of the network coverage area of the base station. That is, the embodiments of the present invention provide a resource allocation method for a link from UE out of network coverage to UE in the network coverage, so as to resolve a resource allocation problem of the link from the UE out of the network coverage to the UE in the network coverage.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
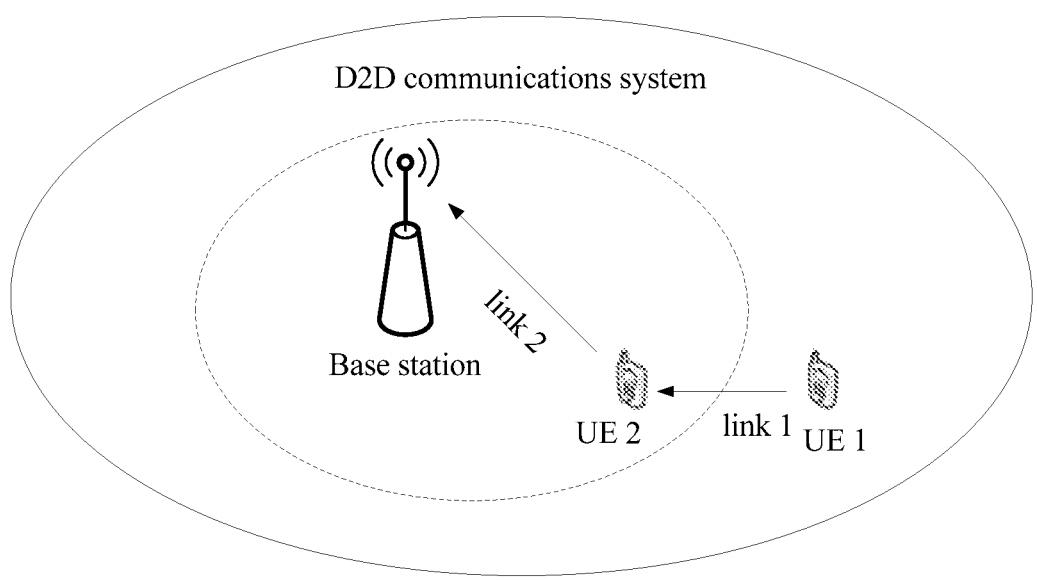
FIG. 1 is a schematic diagram of a scenario of a D2D communications system according to an embodiment of the present invention.

The following describes the technical solutions in the embodiments of the present invention with reference to the accompanying drawings in the embodiments of the present invention. Apparently, the described embodiments are merely a part rather than all of the embodiments of the present invention. In the following descriptions, for a purpose of description instead of limitation, some specific details are described to facilitate clear understanding. In some embodiments, detailed descriptions of a well-known apparatus, circuit, and method are omitted, so as to avoid blurred descriptions caused by unnecessary details. In the thorough descriptions, same reference numerals and same names refer to same or similar elements.

To facilitate clear description of the technical solutions in the embodiments of the present invention, words such as "first" and "second" are used in the embodiments of the present invention to distinguish between same items or similar items that provide basically same functions or purposes. A person skilled in the art may understand that the words such as "first" and "second" do not limit a quantity and an execution order.

Embodiments of the present invention are mainly applied to a D2D communications system. Specifically, the D2D communications system may be a Long Term Evolution (English: Long Term Evolution, LTE for short) or Long Term Evolution Advanced (English: LTE Advanced, LTE-A for short) system, or may be an LTE system of future another release. This is not specifically limited in the embodiments of the present invention. As shown in FIG. 1, the D2D communications system includes a base station, first UE (it is assumed that the first UE is UE 2) in a network coverage area of the base station, and second UE (it is assumed that the second UE is UE 1) out of the network coverage area of the base station, and the UE 2 is configured to transmit data of the UE 1 to the base station. A link between the UE 2 and the base station is denoted as a link 2, and a link between the UE 1 and the UE 2 is denoted as a link 1. Because the link 2 is communication between the UE 2 and the base station, resource allocation information of the link 2 is scheduled by the base station, and the scheduling is consistent with cellular uplink scheduling and resource allocation. Currently, there is no corresponding solution to a resource allocation problem of the link 1. If the UE 1 sends relay information by freely selecting a resource from a resource pool according to an out of coverage communication mode 2 in the system release.12 (English: Release.12, Rel.12 for short), a resource contention problem may exist, a resource needs to be selected from the resource pool again, and a communication delay is increased. Therefore, the resource allocation manner is infeasible.

Figure 2:
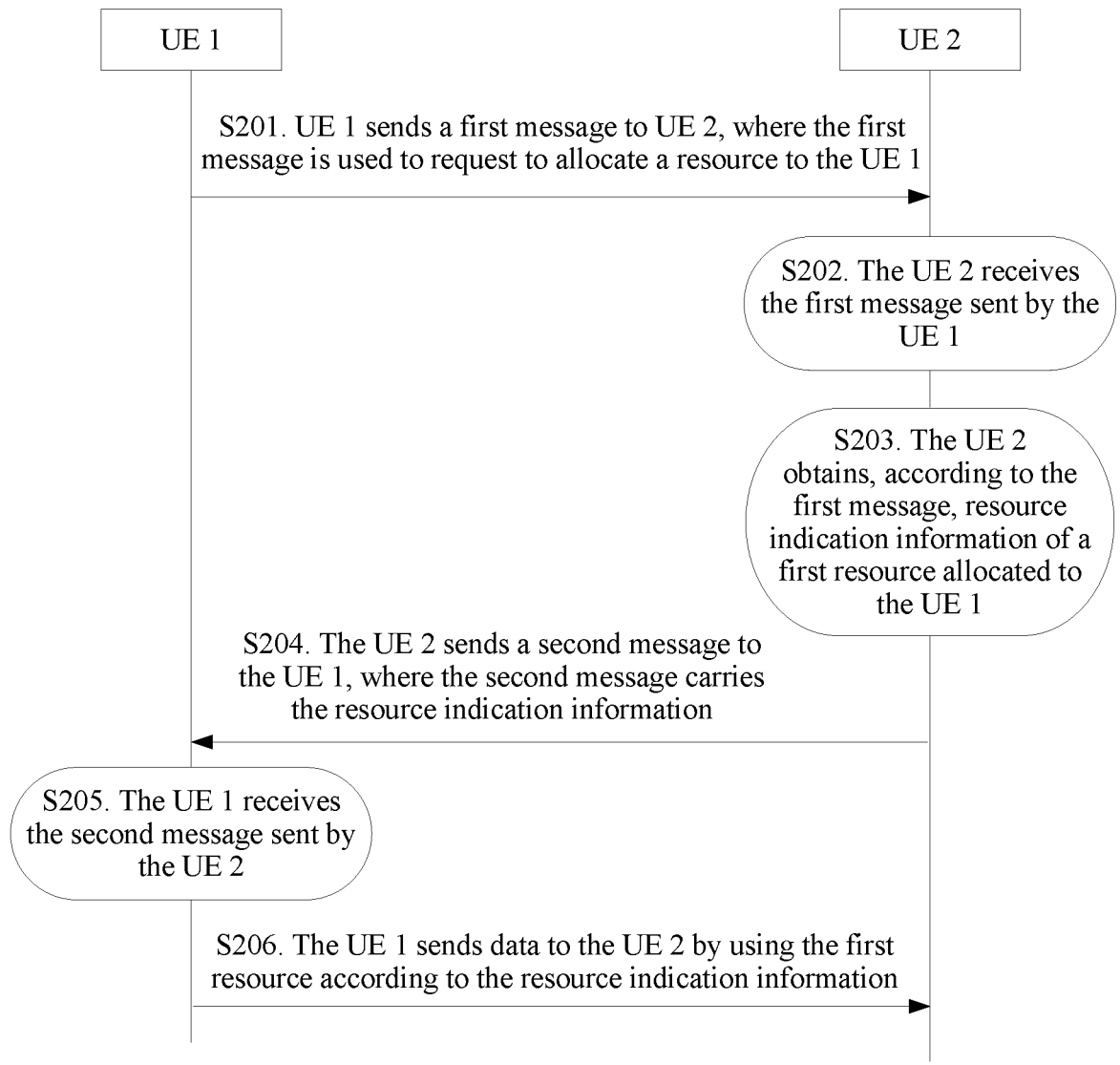
FIG. 2 is a first schematic interaction diagram of a D2D resource allocation method according to an embodiment of the present invention.

Based on the D2D communications system shown in FIG. 1, an embodiment of the present invention provides a D2D resource allocation method. As shown in FIG. 2, the method includes the following steps:

S201. UE 1 sends a first message to UE 2, where the first message is used to request to allocate a resource to the UE 1.

S202. The UE 2 receives the first message sent by the UE 1.

S203. The UE 2 obtains, according to the first message, resource indication information of a first resource allocated to the UE 1.

S204. The UE 2 sends a second message to the UE 1, where the second message carries the resource indication information.

S205. The UE 1 receives the second message sent by the UE 2.

S206. The UE 1 sends data to the UE 2 by using the first resource according to the resource indication information.

This embodiment of the present invention provides the D2D resource allocation method. In the D2D resource allocation method, after receiving the first message that is sent by the UE 1 (UE out of network coverage) and that is used to request to allocate a resource to the UE 1, the UE 2 (UE in network coverage, and configured to transmit data of the UE 1 to a base station) obtains, according to the first message, the resource indication information of the first resource allocated to the UE 1, and then the UE 2 sends the second message to the UE 1, where the second message carries the resource indication information of the first resource. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Figure 3:
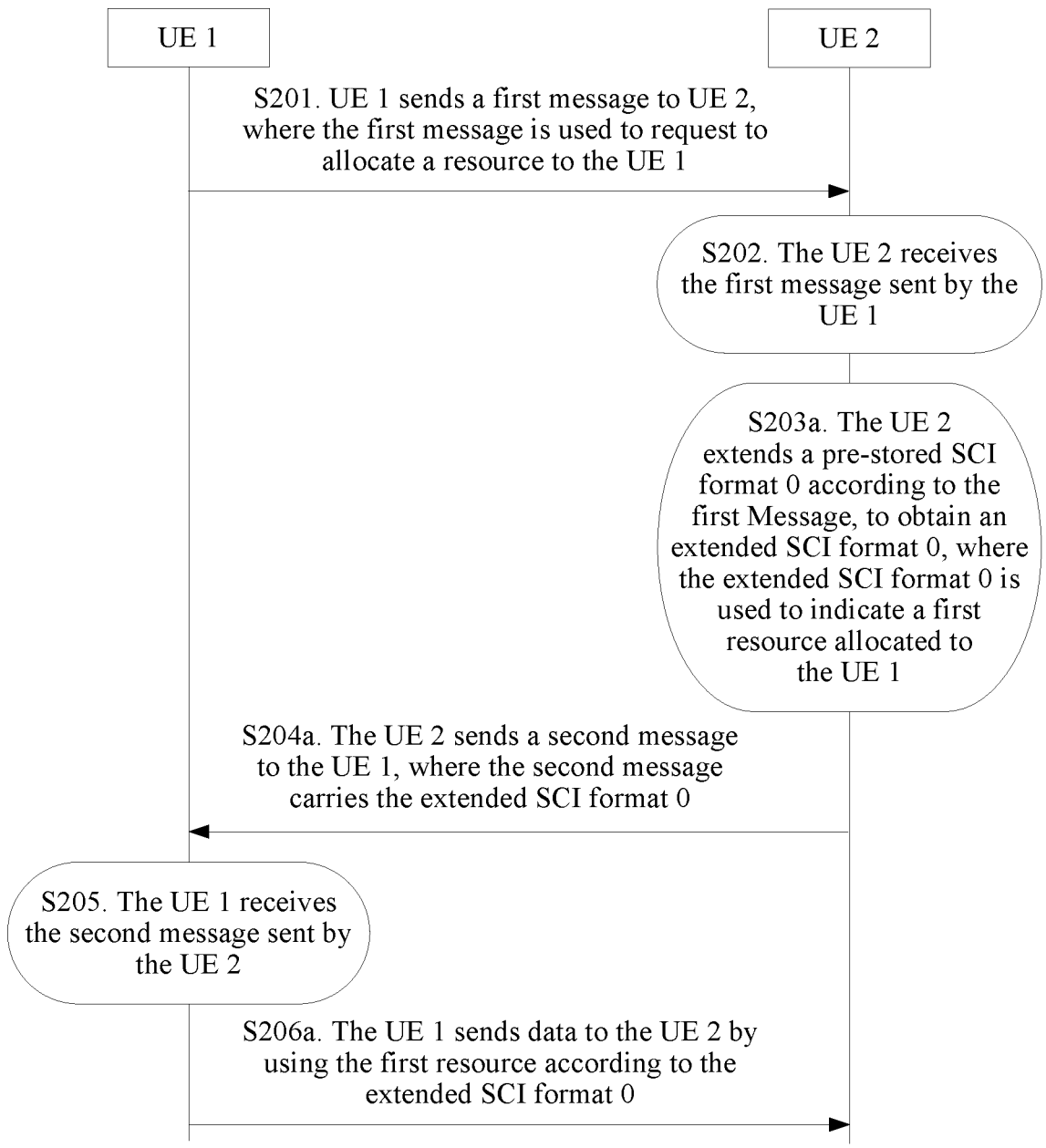
FIG. 3 is a second schematic interaction diagram of a D2D resource allocation method according to an embodiment of the present invention.

Further, in a possible implementation, as shown in FIG. 3, that the UE 2 obtains, according to the first message, resource indication information of a first resource allocated to the second UE (step S203) may specifically include the following step:

S203a. The UE 2 extends a pre-stored sidelink control information (English: Sidelink control information, SCI for short) format 0 according to the first message, to obtain an extended SCI format 0, where the extended SCI format 0 is used to indicate the first resource allocated to the UE 1.

That is, in this case, the resource indication information is specifically the extended SCI format 0.

That is, that the UE 2 sends a second message to the UE 1, where the second message carries the resource indication information (step S204) may specifically include the following step:

S204a. The UE 2 sends the second message to the UE 1, where the second message carries the extended SCI format 0.

That the UE 1 sends data to the UE 2 by using the first resource according to the resource indication information (step S206) may specifically include the following step:

S206a. The UE 1 sends the data to the UE 2 by using the first resource according to the extended SCI format 0.

Specifically, in a Rel.12 D2D communications system, in a link from UE in a network coverage area of a base station to UE out of the network coverage area of the base station, an SCI format 0 is used to allocate a related resource, that is, the SCI format 0 is used to indicate an allocated resource. For example, in the D2D communications system shown in FIG. 1, in the link from the UE 2 to the UE 1, an SCI format 0 may be used to schedule and allocate a resource.

Information included in the SCI format 0 includes:

a 1-bit frequency hopping flag (English: Frequency hopping flag) field;

a resource block assignment and hopping resource allocation (English: Resource block assignment and hopping resource allocation) field, where the field occupies $\lceil \log_2 (N_{RB}^{SL}(N_{RB}^{SL}+1)/2) \rceil$ bits, and $N_{RB}^{SL}$ is configured D2D bandwidth;

a 7-bit time resource pattern (English: Time Resource Pattern, TRP for short) field;

a 5-bit modulation and coding scheme (English: Modulation and coding scheme, MCS for short) field;

an 11-bit timing advance indication (English: Timing advance indication) field; and an 8-bit group destination identifier (English: Group destination ID) field, which is defined at a high layer.

That the UE 2 extends a pre-stored SCI format 0 according to the first message to obtain an extended SCI format 0 (step S203a) includes one or any combination of the following manners:

The UE 2 increases a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

the UE 2 increases a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

the UE 2 increases a time resource pattern field in the pre-stored SCI format 0 by M bits, where the M bits are used to indicate an offset of the first resource on a time domain resource relative to the second resource, and M is a positive integer;

the UE 2 increases a modulation and coding scheme MCS field in the pre-stored SCI format 0 by Z bits, where the Z bits are used to indicate an offset of an MCS index of the first resource relative to an MSC index of the second resource, and Z is a positive integer; or the UE 2 increases a timing advance indication field in the pre-stored SCI format 0 by 1 bit, where the 1 bit is used to indicate whether the second UE uses a timing advance indication of the second UE or uses a timing advance indication of the first UE.

It should be noted that when the UE 2 extends the pre-stored SCI format 0 according to the first message, any field in the SCI format 0 may be extended, or a combination of any multiple fields in the SCI format 0 may be extended. This is not specifically limited in this embodiment of the present invention. Extending a combination of any multiple fields in the SCI format 0 is specifically separately extending the multiple fields in the combination of the multiple fields.

An extension status of each field in the SCI format 0 is described in detail below.

(1) For the Frequency Hopping Flag Field:

The UE 2 increases the frequency hopping flag field in the pre-stored SCI format 0 by 1 bit, where the 1 bit is used to indicate whether the frequency hopping flag in the extended SCI format 0 is the same as the frequency hopping flag in the pre-stored SCI format 0.

It may be configured that the 1 bit being "0" represents that the frequency hopping flag in the extended SCI format 0 is the same as the frequency hopping flag in the pre-stored SCI format 0, and it may be configured that the 1 bit being "1" represents that the frequency hopping flag in the extended SCI format 0 is different from the frequency hopping flag in the pre-stored SCI format 0. Certainly, it may be also configured that the 1 bit being "0" represents that the frequency hopping flag in the extended SCI format 0 is different from the frequency hopping flag in the pre-stored SCI format 0, and it may be configured that the 1 bit being "1" represents that the frequency hopping flag in the extended SCI format 0 is the same as the frequency hopping flag in the pre-stored SCI format 0. This is not specifically limited in this embodiment of the present invention.

(2) For the Resource Block Assignment and Hopping Resource Allocation Field:

The UE 2 increases the resource block assignment and hopping resource allocation field in the pre-stored SCI format 0 by N bits, where the N bits are used to indicate the offset of the first resource on the frequency domain resource relative to the second resource indicated by the pre-stored SCI format 0, and N is a positive integer.

For example, it is assumed that N is 2, that is, 2 bits are used to indicate the offset of the first resource on the frequency domain resource relative to the second resource. A specific offset may be 0 to 3 (00 to 11), which respectively represent that the first resource is offset by 0, 1, 2, or 3 resource blocks in a frequency domain relative to the second resource. For example, if data is received on a resource block S of the second resource, and the offset is 10, the data is sent on a resource block S+2 of the first resource; if the offset is 11, the data is sent on a resource block S+3 of the first resource.

It should be noted that in the foregoing example, that the N bits are a backward offset of the first resource on the frequency domain resource relative to the second resource indicated by the pre-stored SCI format 0 is used as an example for description. Certainly, in this embodiment of the present invention, the N bits may be a forward offset of the first resource on the frequency domain resource relative to the second resource indicated by the pre-stored SCI format 0, or may be a backward offset of the first resource on the frequency domain resource relative to the second resource indicated by the pre-stored SCI format 0. This is not specifically limited in this embodiment of the present invention.

It should be noted that in the foregoing example, that the second resource includes one resource block is used as an example for description. Certainly, the second resource may include more than one resource block. The offset is an offset of all resource blocks in the first resource relative to all resource blocks in the second resource. This is not separately illustrated in this embodiment of the present invention.

(3) For the Time Resource Pattern Field:

The UE 2 increases the time resource pattern field in the pre-stored SCI format 0 by M bits, where the M bits are used to indicate the offset of the first resource on the time domain resource relative to the second resource, and M is a positive integer.

Table 1 shows a part of a related table of a time resource pattern index (English: Index) mapping in the 3GPP technical specification (English: Technical Specification, TS for short) 36.213 V12.6.0 standard, when $N_{TRP}=8$. $N_{TRP}$ represents a bit quantity of a bitmap, $I_{TRP}$ represents the time resource pattern index, $(b'_0, b'_1, \ldots, b'_{N_{TRP}-1})$ represents a subframe indicator bitmap (English: Subframe Indicator Bitmap), and $k_{TRP}$ represents a quantity of 1 s in the subframe indicator bitmap.

TABLE 1

| $I_{TRP}$ | $k_{TRP}$ | $(b'_0, b'_1, \ldots, b'_{N_{TRP}-1})$ |
|---|---|---|
| 0 | 1 | (1, 0, 0, 0, 0, 0, 0, 0) |
| 1 | 1 | (0, 1, 0, 0, 0, 0, 0, 0) |
| 2 | 1 | (0, 0, 1, 0, 0, 0, 0, 0) |
| 3 | 1 | (0, 0, 0, 1, 0, 0, 0, 0) |
| 4 | 1 | (0, 0, 0, 0, 1, 0, 0, 0) |
| 5 | 1 | (0, 0, 0, 0, 0, 1, 0, 0) |
| 6 | 1 | (0, 0, 0, 0, 0, 0, 1, 0) |
| 7 | 1 | (0, 0, 0, 0, 0, 0, 0, 1) |
| 8 | 2 | (1, 1, 0, 0, 0, 0, 0, 0) |
| 9 | 2 | (1, 0, 1, 0, 0, 0, 0, 0) |
| 10 | 2 | (0, 1, 1, 0, 0, 0, 0, 0) |

For example, it is assumed that M is 2, that is, 2 bits are used to indicate the offset of the first resource on the time domain resource relative to the second resource. A specific offset may be 0 to 3 (00 to 11), which respectively represent that the first resource is offset by 0, 1, 2, or 3 time pattern indexes in a time domain relative to the second resource. For example, if $I_{TRP}$ corresponding to the second resource is 0, and the offset is 11, $I_{TRP}$ corresponding to the first resource is 3, and $(b'_0, b'_1, \ldots, b'_{N_{TRP}-1})$ corresponding to the first resource is (0,0,0,1,0,0,0,0).

It should be noted that in the foregoing example, that the N bits are a backward offset of the first resource on the time domain resource relative to the second resource indicated by the pre-stored SCI format 0 is used as an example for description. Certainly, in this embodiment of the present invention, the N bits may be a forward offset of the first resource on the time domain resource relative to the second resource indicated by the pre-stored SCI format 0, or may be a backward offset of the first resource on the time domain resource relative to the second resource indicated by the pre-stored SCI format 0. This is not specifically limited in this embodiment of the present invention.

It should be noted that in the foregoing example, that the second resource is corresponding to only one time pattern index is used as an example for description. Certainly, the second resource may be corresponding to more than one time pattern index. The offset is an offset of all time pattern indexes corresponding to the first resource relative to all time pattern indexes corresponding to the second resource. This is not separately illustrated in this embodiment of the present invention.

(4) For the MCS Field:

The UE 2 increases the MCS field in the pre-stored SCI format 0 by Z bits, where the Z bits are used to indicate the offset of the MCS index of the first resource relative to the MSC index of the second resource, and Z is a positive integer.

Table 2 shows a part of an MCS-related table in the 3 GPP TS 36.213 V12.6.0 standard. Different MCS indexes are corresponding to different modulation orders (English: Modulation Order) and different transport block size (English: Transport Block Size, TBS for short) indexes.

TABLE 2

| MCS Index | Modulation Order | TBS Index |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |

For example, it is assumed that Z is 4, that is, 4 bits are used to indicate the offset of the MCS index of the first resource relative to the MSC index of the second resource. A specific offset may be 0 to 15 (0000 to 1111), which respectively represent that the MCS index of the first resource is offset by 0 to 15 MCS indexes relative to the MCS index of the second resource. For example, if the MCS index of the second resource is 3, and the offset is 0101, the MCS index of the first resource is 8.

(5) For the Timing Advance Indication Field:

The UE 2 increases the timing advance indication field in the pre-stored SCI format 0 by 1 bit, where the 1 bit is used to indicate whether the second UE uses the timing advance indication of the second UE or uses the timing advance indication of the first UE.

To ensure time synchronization on a base station side, an uplink timing advance (English: Timing Advance, TA for short) mechanism is proposed in LTE. For UE, the TA mechanism is essentially a negative offset (English: negative offset) between a start time of receiving a downlink subframe and a time of transmitting an uplink subframe. The base station may control, by properly controlling an offset of each UE, times at which uplink signals from different UEs reach the base station. For UE that is relatively far away from the base station, due to a relatively large transmission delay, the UE usually needs to send uplink data earlier than UE that is relatively close to the base station.

For the D2D communications system, to avoid interference to or from a cell signal or a wide area network (English: Wide Area Network, WAN for short) signal, the TA is used in D2D communication, so that times at which different UEs reach the base station can be aligned, and no interference is caused.

(6) For the Group Destination Identifier Field

Specifically, when the SCI format 0 is extended, because currently studied D2D communication is broadcast communication, an included identifier is a group identifier, and both the UE 1 and the UE 2 are UEs in the group, the group destination identifier field in the SCI format 0 does not need to be changed.

It should be noted that the foregoing embodiment provides a manner in which the UE 2 allocates the first resource to the UE 1 in a manner of extending the pre-stored SCI format 0. Certainly, the UE 2 may also allocate the first resource to the UE 1 in another manner, and this is not specifically limited in this embodiment of the present invention.

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) allocates the first resource to the UE 1 in a manner of extending the pre-stored SCI format 0, and then the UE 2 sends the second message to the UE 1, where the second message carries the extended SCI format 0, and the extended SCI format 0 is used to indicate the first resource allocated to the UE 1. In this way, after receiving the second message, the UE 1 may send the data to the UE 2 by using the first resource according to the extended SCI format 0. That is, this embodiment of the present invention provides a resource allocation method for a link from UE out of network coverage to UE in the network coverage, so as to resolve a resource allocation problem of a link from UE out of network coverage to UE in the network coverage.

Preferably, the first resource has a fixed offset relative to the second resource indicated by the pre-stored SCI format 0.

If contention occurs between a link resource from the UE 2 to the UE 1 and a link resource from the UE 1 to the UE 2, signal interference between links is caused. Therefore, in this embodiment of the present invention, the first resource allocated by the UE 2 to the UE 1 has the fixed offset relative to the second resource indicated by the pre-stored SCI format. In this way, contention between the link resource from the UE 2 to the UE 1 and the link resource from the UE 1 to the UE 2 can be avoided, and signal interference between the links is avoided.

Figure 4A:
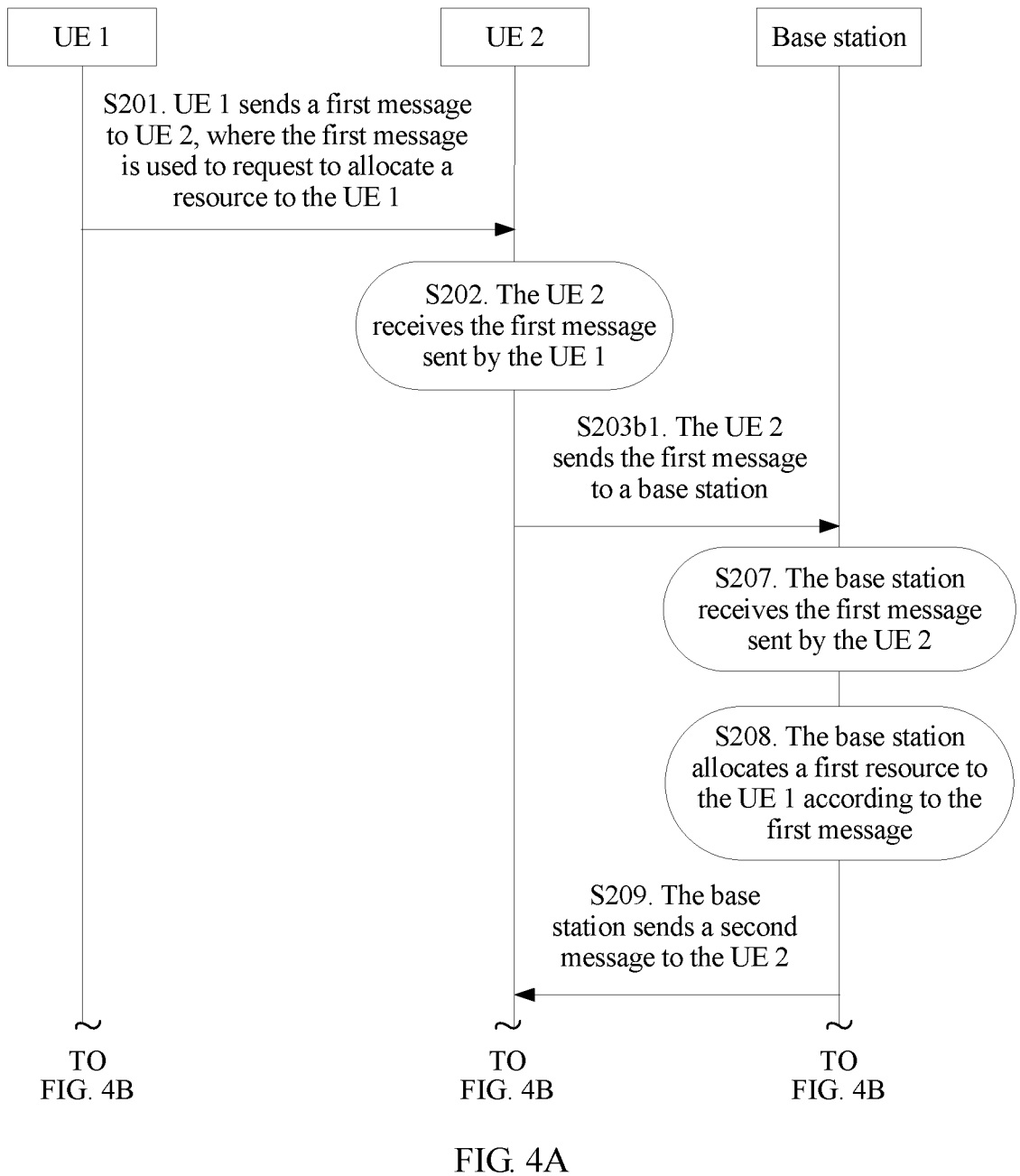
FIG. 4A and FIG. 4B are a second schematic interaction diagram of a D2D resource allocation method according to an embodiment of the present invention.
Figure 4B:
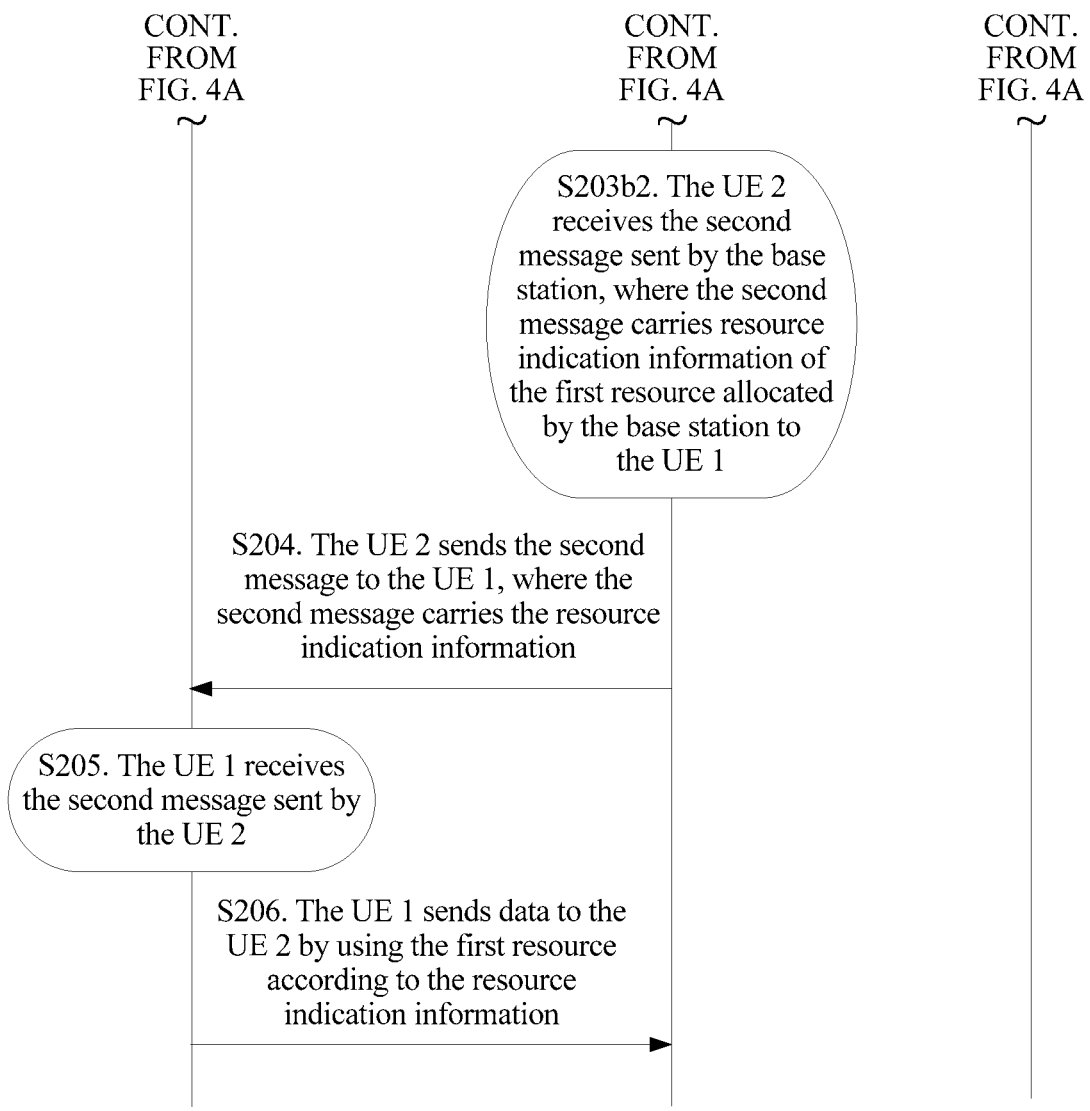

In another possible implementation, as shown in FIG. 4A and FIG. 4B, that the UE 2 obtains, according to the first message, resource indication information of a first resource allocated to the UE 1 (step S203) may specifically include the following steps:

S203b1. The UE 2 sends the first message to a base station.

S203b2. The UE 2 receives the second message sent by the base station, where the second message carries the resource indication information of the first resource allocated by the base station to the UE 1.

Correspondingly, on the base station side, the D2D resource allocation method further includes the following steps:

S207. The base station receives the first message sent by the UE 2.

S208. The base station allocates the first resource to the UE 1 according to the first message.

S209. The base station sends the second message to the UE 2.

Specifically, the base station may send the second message to the UE 2 by using downlink control information (English: Downlink control information, DCI for short).

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) sends the first message to the base station, the base station allocates the first resource to the UE 1, and then the base station sends the second message to the UE 1 by using the UE 2, where the second message carries the resource indication information of the first resource. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Figure 5:
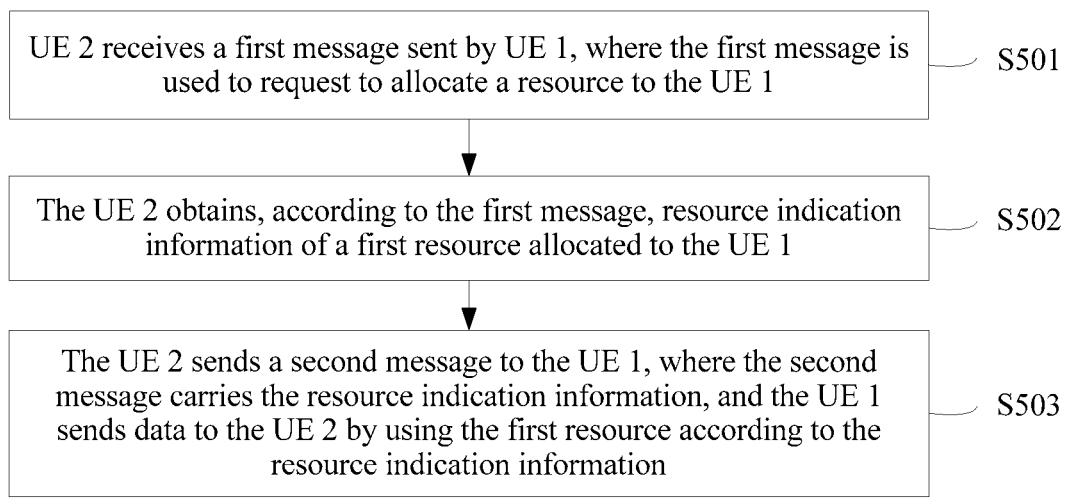
FIG. 5 is a first schematic flowchart of a D2D resource allocation method according to an embodiment of the present invention.

Based on the D2D communications system shown in FIG. 1, an embodiment of the present invention further provides a D2D resource allocation method. UE 2 is used as an execution body for description. As shown in FIG. 5, the method includes the following steps:

S501. The UE 2 receives a first message sent by UE 1, where the first message is used to request to allocate a resource to the UE 1.

S502. The UE 2 obtains, according to the first message, resource indication information of a first resource allocated to the UE 1.

S503. The UE 2 sends a second message to the UE 1, where the second message carries the resource indication information, and the UE 1 sends data to the UE 2 by using the first resource according to the resource indication information.

This embodiment of the present invention provides the D2D resource allocation method. In the D2D resource allocation method, after receiving the first message that is sent by the UE 1 (UE out of network coverage) and that is used to request to allocate a resource to the UE 1, the UE 2 (UE in network coverage, and configured to transmit data of the UE 1 to a base station) obtains, according to the first message, the resource indication information of the first resource allocated to the UE 1, and then the UE 2 sends the second message to the UE 1, where the second message carries the resource indication information of the first resource. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Figure 6:
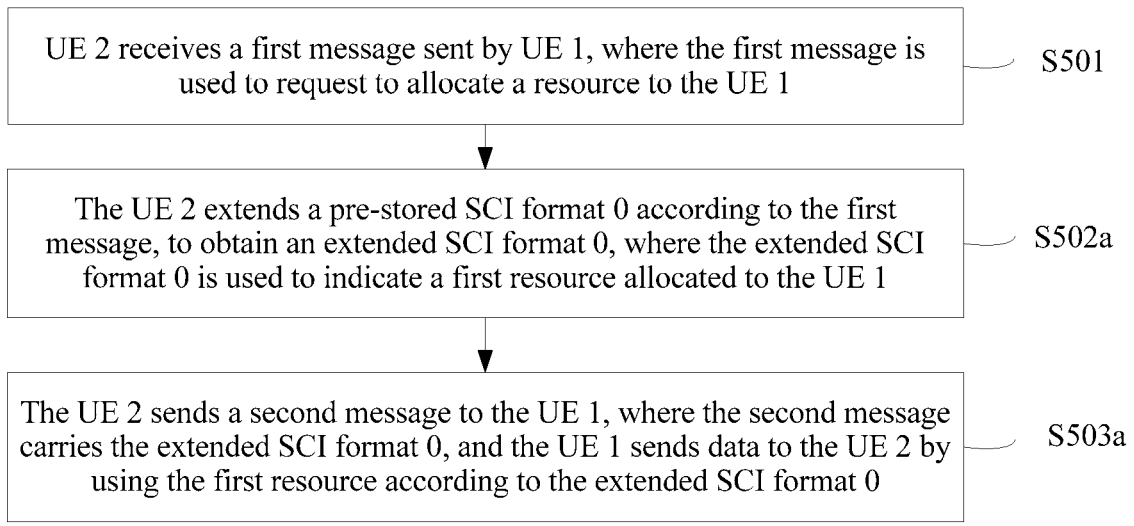
FIG. 6 is a second schematic flowchart of a D2D resource allocation method according to an embodiment of the present invention.

Further, in a possible implementation, as shown in FIG. 6, that the UE 2 obtains, according to the first message, resource indication information of a first resource allocated to the UE 1 (step S502) may specifically include the following step:

S502a. The UE 2 extends a pre-stored SCI format 0 according to the first message, to obtain an extended SCI format 0, where the extended SCI format 0 is used to indicate the first resource allocated to the UE 1.

That is, in this case, the resource indication information is specifically the extended SCI format 0.

That is, that the UE 2 sends a second message to the UE 1, where the second message carries the resource indication information, and the UE 1 sends data to the UE 2 by using the first resource according to the resource indication information (step S503) may specifically include the following step:

S503a. The UE 2 sends the second message to the UE 1, where the second message carries the extended SCI format 0, and the UE 1 sends the data to the UE 2 by using the first resource according to the extended SCI format 0.

That the UE 2 extends a pre-stored SCI format 0 according to the first message to obtain an extended SCI format 0 (step S502*a*) includes one or any combination of the following manners:

The UE 2 increases a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

the UE 2 increases a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

the UE 2 increases a time resource pattern field in the pre-stored SCI format 0 by M bits, where the M bits are used to indicate an offset of the first resource on a time domain resource relative to the second resource, and M is a positive integer;

the UE 2 increases a modulation and coding scheme MCS field in the pre-stored SCI format 0 by Z bits, where the Z bits are used to indicate an offset of an MCS index of the first resource relative to an MSC index of the second resource, and Z is a positive integer; or the UE 2 increases a timing advance indication field in the pre-stored SCI format 0 by 1 bit, where the 1 bit is used to indicate whether the second UE uses a timing advance indication of the second UE or uses a timing advance indication of the first UE.

It should be noted that when the UE 2 extends the pre-stored SCI format 0 according to the first message, any field in the SCI format 0 may be extended, or a combination of any multiple fields in the SCI format 0 may be extended. This is not specifically limited in this embodiment of the present invention. Extending a combination of any multiple fields in the SCI format 0 is specifically separately extending the multiple fields in the combination of the multiple fields.

Specifically, for related descriptions of the SCI format 0 and detailed descriptions of an extension status of each field in the SCI format 0, refer to the foregoing method embodiment, and details are not described in this embodiment of the present invention.

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) allocates the first resource to the UE 1 in a manner of extending the pre-stored SCI format 0, and then the UE 2 sends the second message to the UE 1, where the second message carries the extended SCI format 0, and the extended SCI format 0 is used to indicate the first resource allocated to the UE 1. In this way, after receiving the second message, the UE 1 may send the data to the UE 2 by using the first resource according to the extended SCI format 0. That is, this embodiment of the present invention provides a resource allocation method for a link from UE out of network coverage to UE in the network coverage, so as to resolve a resource allocation problem of a link from UE out of network coverage to UE in the network coverage.

Figure 7:
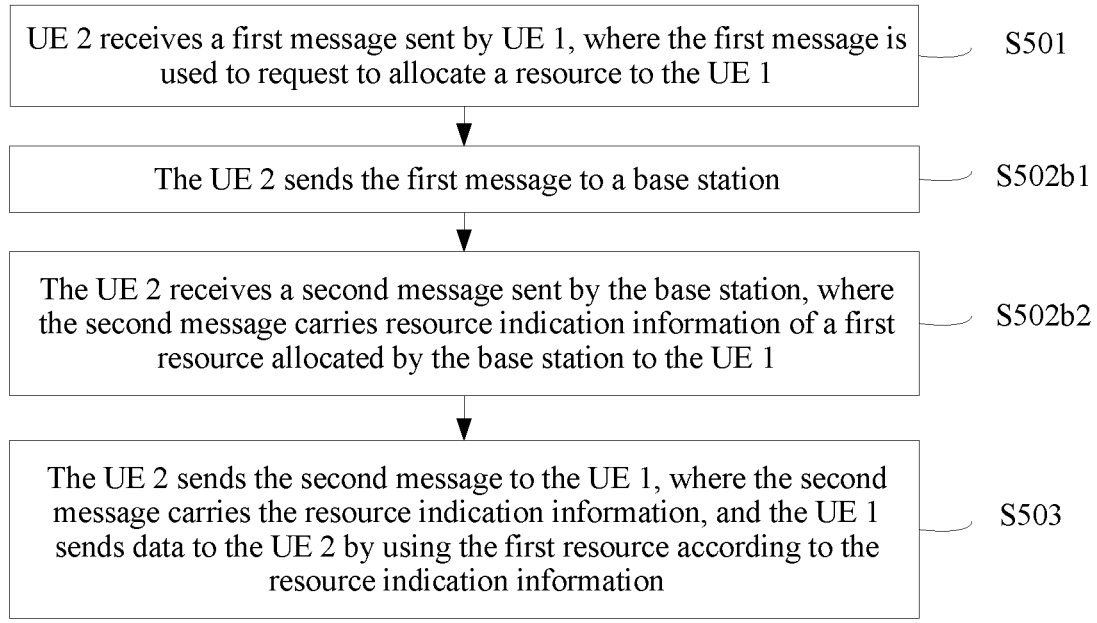
FIG. 7 is a third schematic flowchart of a D2D resource allocation method according to an embodiment of the present invention.

In another possible implementation, as shown in FIG. 7, that the UE 2 obtains, according to the first message, resource indication information of a first resource allocated to the UE 1 (step S502) may specifically include the following steps:

S502b1. The UE 2 sends the first message to a base station.

S502b2. The UE 2 receives the second message sent by the base station, where the second message carries the resource indication information of the first resource allocated by the base station to the UE 1.

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) sends the first message to the base station, the base station allocates the first resource to the UE 1, and then the base station sends the second message to the UE 1 by using the UE 2, where the second message carries the resource indication information of the first resource. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Preferably, in the embodiment shown in FIG. 5 or FIG. 6, the first resource has a fixed offset relative to the second resource indicated by the pre-stored SCI format 0.

If contention occurs between a link resource from the UE 2 to the UE 1 and a link resource from the UE 1 to the UE 2, signal interference between links is caused. Therefore, in this embodiment of the present invention, the first resource allocated by the UE 2 to the UE 1 has the fixed offset relative to the second resource indicated by the pre-stored SCI format. In this way, contention between the link resource from the UE 2 to the UE 1 and the link resource from the UE 1 to the UE 2 can be avoided, and signal interference between the links is avoided.

Figure 8:
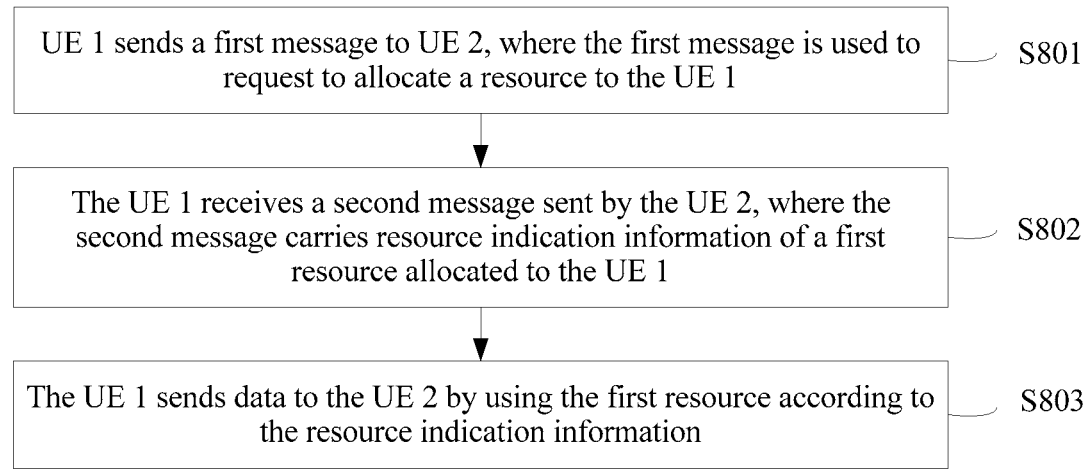
FIG. 8 is a fourth schematic flowchart of a D2D resource allocation method according to an embodiment of the present invention.

Based on the D2D communications system shown in FIG. 1, an embodiment of the present invention further provides a D2D resource allocation method. UE 1 is used as an execution body for description. As shown in FIG. 8, the method includes the following steps:

S801. The UE 1 sends a first message to UE 2, where the first message is used to request to allocate a resource to the UE 1.

S802. The UE 1 receives a second message sent by the UE 2, where the second message carries resource indication information of a first resource allocated to the UE 1.

S803. The UE 1 sends data to the UE 2 by using the first resource according to the resource indication information.

This embodiment of the present invention provides the D2D resource allocation method. In the D2D resource allocation method, after receiving the first message that is sent by the UE 1 (UE out of network coverage) and that is used to request to allocate a resource to the UE 1, the UE 2 (UE in network coverage, and configured to transmit data of the UE 1 to a base station) sends the second message to the UE 1, where the second message carries the resource indication information of the first resource allocated to the UE 1. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

In a possible implementation, the first resource is allocated to the UE 1 after the UE 2 extends a pre-stored SCI format 0 according to the first message.

Specifically, for related descriptions of the SCI format 0 and specific descriptions of extending the pre-stored SCI format 0 by the UE 2 according to the first message to obtain an extended SCI format 0, refer to the foregoing method embodiment, and details are not described in this embodiment of the present invention.

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) allocates the first resource to the UE 1 in a manner of extending the pre-stored SCI format 0, and then the UE 2 sends the second message to the UE 1, where the second message carries the extended SCI format 0, and the extended SCI format 0 is used to indicate the first resource allocated to the UE 1. In this way, after receiving the second message, the UE 1 may send the data to the UE 2 by using the first resource according to the extended SCI format 0. That is, this embodiment of the present invention provides a resource allocation method for a link from UE out of network coverage to UE in the network coverage, so as to resolve a resource allocation problem of a link from UE out of network coverage to UE in the network coverage.

Preferably, the first resource has a fixed offset relative to a second resource indicated by the pre-stored SCI format 0.

If contention occurs between a link resource from the UE 2 to the UE 1 and a link resource from the UE 1 to the UE 2, signal interference between links is caused. Therefore, in this embodiment of the present invention, the first resource allocated by the UE 2 to the UE 1 has the fixed offset relative to the second resource indicated by the pre-stored SCI format. In this way, contention between the link resource from the UE 2 to the UE 1 and the link resource from the UE 1 to the UE 2 can be avoided, and signal interference between the links is avoided.

In another possible implementation, the first resource is allocated by the base station to the UE 1 after the UE 2 sends the first message to the base station.

In the D2D resource allocation method, after receiving the first message that is sent by the UE 1 (UE out of network coverage) and that is used to request to allocate a resource to the UE 1, the UE 2 (UE in network coverage, and configured to transmit the data of the UE 1 to the base station) sends the first message to the base station, the base station allocates the first resource to the UE 1, and then the base station sends the second message to the UE 1 by using the UE 2, where the second message carries the resource indication information of the first resource. In this way, after receiving the second message, the UE 1 may send the data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Figure 9:
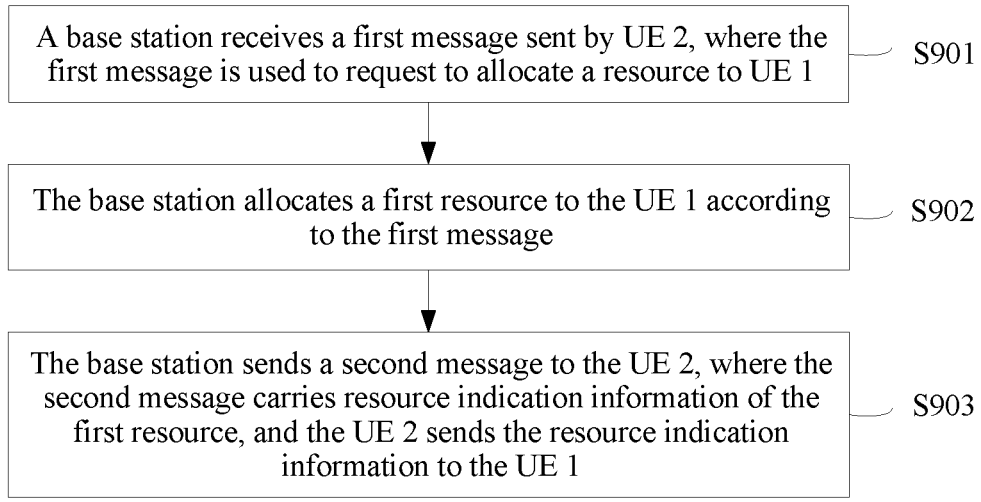
FIG. 9 is a fifth schematic flowchart of a D2D resource allocation method according to an embodiment of the present invention.

Based on the D2D communications system shown in FIG. 1, an embodiment of the present invention further provides a D2D resource allocation method. A base station is used as an execution body for description. As shown in FIG. 9, the method includes the following steps:

S901. The base station receives a first message sent by UE 2, where the first message is used to request to allocate a resource to UE 1.

S902. The base station allocates a first resource to the UE 1 according to the first message.

S903. The base station sends a second message to the UE 2, where the second message carries resource indication information of the first resource, and the UE 2 sends the resource indication information to the UE 1.

Specifically, the base station may send the second message to the UE 2 by using DCI.

This embodiment of the present invention provides the D2D resource allocation method. In the D2D resource allocation method, after receiving the first message that is sent by the UE 1 (UE out of network coverage) and that is used to request to allocate a resource to the UE 1, the UE 2 (UE in network coverage, and configured to transmit data of the UE 1 to the base station) sends the first message to the base station, the base station allocates the first resource to the UE 1, and then the base station sends the second message to the UE 1 by using the UE 2, where the second message carries the resource indication information of the first resource. In this way, after receiving the second message, the UE 1 may send data to the UE 2 by using the first resource according to the resource indication information. That is, this embodiment of the present invention provides a resource allocation method for a link from UE out of network coverage to UE in the network coverage, so as to resolve a resource allocation problem of a link from UE out of network coverage to UE in the network coverage.

Figure 10:
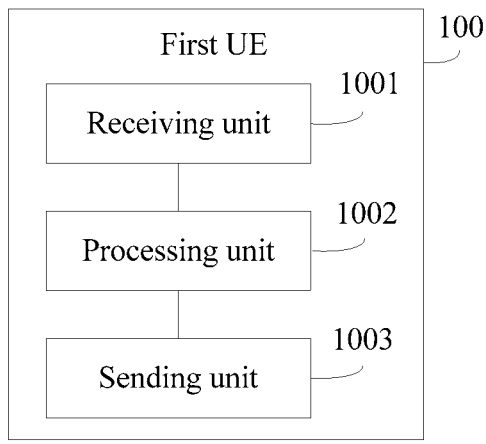
FIG. 10 is a first schematic structural diagram of first UE according to an embodiment of the present invention.

An embodiment of the present invention provides first UE 100. As shown in FIG. 10, the first UE 100 includes a receiving unit 1001, a processing unit 1002, and a sending unit 1003.

The receiving unit 1001 is configured to receive a first message sent by second UE, where the first message is used to request to allocate a resource to the second UE, the first UE 100 is UE in a network coverage area of a base station, and the second UE is UE out of the network coverage area of the base station.

The processing unit 1002 is configured to obtain, according to the first message, resource indication information of a first resource allocated to the second UE.

The sending unit 1003 is configured to send a second message to the second UE, where the second message carries the resource indication information, and the second UE sends data to the first UE 100 by using the first resource according to the resource indication information.

In a possible implementation, the processing unit 1002 is specifically configured to:

extend a pre-stored sidelink control information SCI format 0 according to the first message, to obtain an extended SCI format 0, where the extended SCI format 0 is used to indicate the first resource allocated to the second UE.

Further, the processing unit is specifically configured to execute one or any combination of the following manners:

increasing a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

increasing a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

increasing a time resource pattern field in the pre-stored SCI format 0 by M bits, where the M bits are used to indicate an offset of the first resource on a time domain resource relative to the second resource, and M is a positive integer;

increasing a modulation and coding scheme MCS field in the pre-stored SCI format 0 by Z bits, where the Z bits are used to indicate an offset of an MCS index of the first resource relative to an MSC index of the second resource, and Z is a positive integer; or increasing a timing advance indication field in the pre-stored SCI format 0 by 1 bit, where the 1 bit is used to indicate whether the second UE uses a timing advance indication of the second UE or uses a timing advance indication of the first UE.

Preferably, the first resource has a fixed offset relative to the second resource indicated by the pre-stored SCI format 0.

In another possible implementation, the processing unit 1002 is specifically configured to:

send the first message to the base station; and receive the second message sent by the base station, where the second message carries the resource indication information of the first resource allocated by the base station to the second UE.

It should be noted that the sending unit 1003 in this embodiment may be an interface circuit that is on the first UE 100 and that has a transmit function, such as a transmitter; and the receiving unit 1001 may be an interface circuit that is on the first UE 100 and that has a reception function, such as a receiver. The processing unit 1002 may be a separately disposed processor, or may be integrated into a processor of the first UE 100. In addition, the processing unit 1002 may be stored in a memory of the first UE 100 in a form of program code, and a processor of the first UE 100 invokes and executes the foregoing function of the processing unit 1002. The processor herein may be a central processing unit (English: Central Processing Unit, CPU for short), or an application-specific integrated circuit (English: Application Specific Integrated Circuit, ASIC for short), or one or more integrated circuits configured to implement this embodiment of the present invention.

Specifically, for the D2D resource allocation method performed by the first UE 100 provided in this embodiment of the present invention, refer to the foregoing method embodiment, and details are not described in this embodiment of the present invention.

This embodiment of the present invention provides the first UE, where the first UE is UE in the network coverage area of the base station and is configured to transmit data of the second UE to the base station, and the second UE is UE out of the network coverage area of the base station. In this embodiment of the present invention, after receiving the first message that is sent by the second UE and that is used to request to allocate a resource to the second UE, the first UE obtains, according to the first message, the resource indication information of the first resource allocated to the second UE, and then the first UE sends the second message to the second UE, where the second message carries the resource indication information of the first resource. In this way, after receiving the second message, the second UE may send the data to the first UE by using the first resource according to the resource indication information. That is, by using the first UE provided in this embodiment of the present invention, resource allocation of a link from UE out of network coverage to UE in the network coverage can be implemented, so that a resource allocation problem of the link from the UE out of the network coverage to the UE in the network coverage is resolved.

Figure 11:
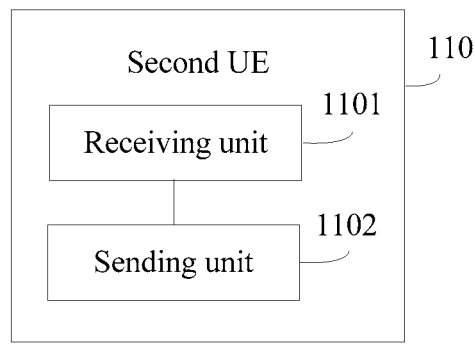
FIG. 11 is a first schematic structural diagram of second UE according to an embodiment of the present invention.

An embodiment of the present invention provides second UE 110. As shown in FIG. 11, the second UE 110 includes a sending unit 1102 and a receiving unit 1101.

The sending unit 1102 is configured to send a first message to second UE 110, where the first message is used to request to allocate a resource to the second UE 110, the first UE is UE in a network coverage area of a base station, and the second UE 110 is UE out of the network coverage area of the base station.

The receiving unit 1101 is configured to receive a second message sent by the first UE, where the second message carries resource indication information of a first resource allocated to the second UE 110.

The sending unit 1102 is further configured to send data to the first UE by using the first resource according to the resource indication information.

In a possible implementation, the first resource is allocated to the second UE after the first UE extends a pre-stored sidelink control information SCI format 0 according to the first message.

Specifically, for related descriptions of the SCI format 0 and specific descriptions of extending the pre-stored SCI format 0 by the first UE according to the first message, refer to the foregoing method embodiment, and details are not described in this embodiment of the present invention.

Preferably, the first resource has a fixed offset relative to a second resource indicated by the pre-stored SCI format 0.

In another possible implementation, the first resource is allocated by the base station to the second UE 110 after the first UE sends the first message to the base station.

It should be noted that the sending unit 1102 in this embodiment may be an interface circuit that is on the second UE 110 and that has a transmit function, such as a transmitter; and the receiving unit 1101 may be an interface circuit that is on the second UE 110 and that has a reception function, such as a receiver.

Specifically, for the D2D resource allocation method performed by the second UE 110 provided in this embodiment of the present invention, refer to the foregoing method embodiment, and details are not described in this embodiment of the present invention.

This embodiment of the present invention provides the second UE, where the second UE is UE out of the network coverage area of the base station. In this embodiment of the present invention, after the second UE sends, to the first UE, the first message that is used to request to allocate a resource to the second UE, the first UE sends the second message to the second UE, where the second message carries the resource indication information of the first resource allocated to the second UE. In this way, after receiving the second message, the second UE may send the data to the first UE by using the first resource according to the resource indication information. The first UE is UE in the network coverage area of the base station. That is, by using the second UE provided in this embodiment of the present invention, resource allocation of a link from UE out of network coverage to UE in the network coverage can be implemented, so that a resource allocation problem of the link from the UE out of the network coverage to the UE in the network coverage is resolved.

Figure 12:
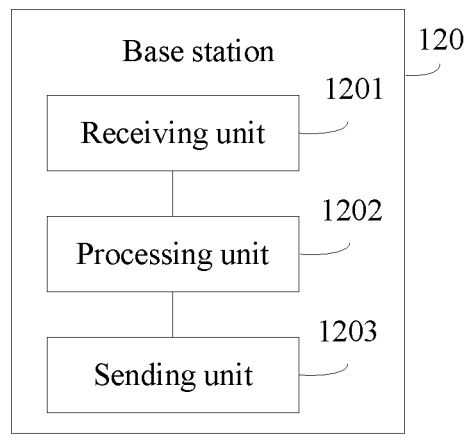
FIG. 12 is a first schematic structural diagram of a base station according to an embodiment of the present invention.

An embodiment of the present invention provides a base station 120. As shown in FIG. 12, the base station 120 includes a receiving unit 1201, a processing unit 1202, and a sending unit 1203.

The receiving unit 1201 is configured to receive a first message sent by first UE, where the first message is used to request to allocate a resource to the second UE, the first UE is UE in a network coverage area of the base station 120, and the second UE is UE out of the network coverage area of the base station 120.

The processing unit 1202 is configured to allocate a first resource to the second UE according to the first message.

The sending unit 1203 is configured to send a second message to the first UE, where the second message carries resource indication information of the first resource, and the first UE sends the resource indication information to the second UE.

It should be noted that the sending unit 1203 in this embodiment may be an interface circuit that is on the base station 120 and that has a transmit function, such as a transmitter; and the receiving unit 1201 may be an interface circuit that is on the base station 120 and that has a reception function, such as a receiver. The processing unit 1202 may be a separately disposed processor, or may be integrated into a processor of the first UE. In addition, the processing unit 1202 may be stored in a memory of the first UE in a form of program code, and a processor of the first UE invokes and executes the foregoing function of the processing unit 1202. The processor described herein may be a CPU, or an ASIC, or one or more integrated circuits configured to implement this embodiment of the present invention.

Specifically, for the D2D resource allocation method performed by the base station 120 provided in this embodiment of the present invention, refer to the foregoing method embodiment, and details are not described in this embodiment of the present invention.

This embodiment of the present invention provides the base station. After receiving the first message that is sent by the first UE and that is used to request to allocate a resource to the second UE, the base station allocates the first resource to the second UE, and the base station sends the second message to the second UE by using the first UE, where the second message carries the resource indication information of the first resource. In this way, after receiving the second message, the second UE may send data to the first UE by using the first resource according to the resource indication information. The first UE is UE in the network coverage area of the base station, and the second UE is UE out of the network coverage area of the base station. That is, by using the base station provided in this embodiment of the present invention, resource allocation of a link from UE out of network coverage to UE in the network coverage can be implemented, so that a resource allocation problem of the link from the UE out of the network coverage to the UE in the network coverage is resolved.

Figure 13:
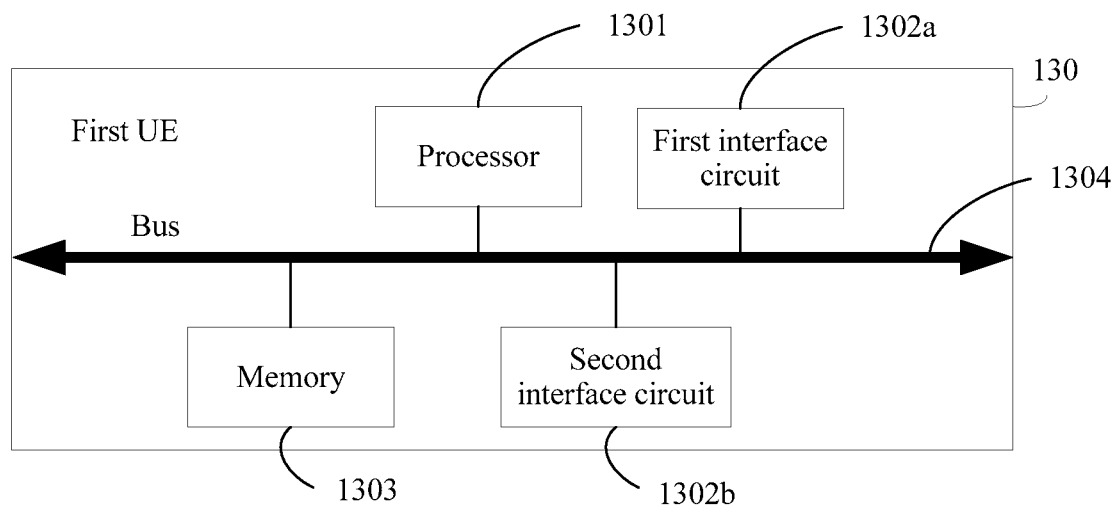
FIG. 13 is a second schematic structural diagram of first UE according to an embodiment of the present invention.

An embodiment of the present invention provides first UE 130. As shown in FIG. 13, the first UE 130 includes a processor 1301, a first interface circuit 1302*a*, a second interface circuit 1302*b*, a memory 1303, and a bus 1304. The processor 1301, the first interface circuit 1302*a*, the second interface circuit 1302*b*, and the memory 1303 are connected and complete mutual communication by using the bus 1304.

It should be noted that the processor 1301 herein may be one processor, or may be a general term of a plurality of processing elements. For example, the processor 1301 may be a CPU, or may be an ASIC, or one or more integrated circuits configured to implement this embodiment of the present invention, such as one or more microprocessors (English: digital singnal processor, DSP for short), or one or more field programmable gate arrays (English: Field Programmable Gate Array, FPGA for short).

The memory 1303 may be one storage apparatus or may be a general term of a plurality of storage elements, and is configured to store executable program code or a parameter, data, and the like that are required for running an access network management device. In addition, the memory 1303 may include a random access memory (English: Random-Access Memory, RAM for short), or may include a non-volatile memory (English: non-volatile memory, NVRAM for short), such as a magnetic disk memory or a flash memory (Flash).

The bus 1304 may be an industry standard architecture (English: Industry Standard Architecture, ISA for short) bus, a Peripheral Component Interconnect (English: Peripheral Component, PCI for short) bus, an extended industry standard architecture (English: Extended Industry Standard Architecture, EISA for short) bus, or the like. The bus 1304 may be classified into an address bus, a data bus, a control bus, or the like. For ease of denotation, the bus 1304 is indicated by using only one bold line in FIG. 13; however, it does not indicate that there is only one bus or only one type of bus.

The first interface circuit 1302a is configured to receive a first message sent by second UE, where the first message is used to request to allocate a resource to the second UE, the first UE 130 is UE in a network coverage area of a base station, and the second UE is UE out of the network coverage area of the base station.

The processor 1301 is configured to obtain, according to the first message, resource indication information of a first resource allocated to the second UE.

The second interface circuit 1302b is configured to send a second message to the second UE, where the second message carries the resource indication information, and the second UE sends data to the first UE 130 by using the first resource according to the resource indication information.

In a possible implementation, the processor 1301 is specifically configured to:

extend a pre-stored sidelink control information SCI format 0 according to the first message, to obtain an extended SCI format 0, where the extended SCI format 0 is used to indicate the first resource allocated to the second UE.

Further, the processor 1301 is specifically configured to execute one or any combination of the following manners:

increasing a frequency hopping flag field in the pre-stored SCI format 0 by 1 bit, where the 1 bit is used to indicate whether a frequency hopping flag in the extended SCI format 0 is the same as a frequency hopping flag in the pre-stored SCI format 0;

increasing a resource block assignment and hopping resource allocation field in the pre-stored SCI format 0 by N bits, where the N bits are used to indicate an offset of the first resource on a frequency domain resource relative to a second resource indicated by the pre-stored SCI format 0, and N is a positive integer;

increasing a time resource pattern field in the pre-stored SCI format 0 by M bits, where the M bits are used to indicate an offset of the first resource on a time domain resource relative to the second resource, and M is a positive integer;

increasing a modulation and coding scheme MCS field in the pre-stored SCI format 0 by Z bits, where the Z bits are used to indicate an offset of an MCS index of the first resource relative to an MSC index of the second resource, and Z is a positive integer; or increasing a timing advance indication field in the pre-stored SCI format 0 by 1 bit, where the 1 bit is used to indicate whether the second UE uses a timing advance indication of the second UE or uses a timing advance indication of the first UE.

Preferably, the first resource has a fixed offset relative to the second resource indicated by the pre-stored SCI format 0.

In another possible implementation, the processor 1301 is specifically configured to:

send the first message to the base station by using the second interface circuit 1302b; and receive, by using the first interface circuit 1302a, the second message sent by the base station, where the second message carries the resource indication information of the first resource allocated by the base station to the second UE.

Specifically, for the D2D resource allocation method performed by the first UE 130 provided in this embodiment of the present invention, refer to the foregoing method embodiment, and details are not described in this embodiment of the present invention.

This embodiment of the present invention provides the first UE, where the first UE is UE in the network coverage area of the base station and is configured to transmit data of the second UE to the base station, and the second UE is UE out of the network coverage area of the base station. In this embodiment of the present invention, after receiving the first message that is sent by the second UE and that is used to request to allocate a resource to the second UE, the first UE obtains, according to the first message, the resource indication information of the first resource allocated to the second UE, and then the first UE sends the second message to the second UE, where the second message carries the resource indication information of the first resource. In this way, after receiving the second message, the second UE may send the data to the first UE by using the first resource according to the resource indication information. That is, by using the first UE provided in this embodiment of the present invention, resource allocation of a link from UE out of network coverage to UE in the network coverage can be implemented, so that a resource allocation problem of the link from the UE out of the network coverage to the UE in the network coverage is resolved.

Figure 14:
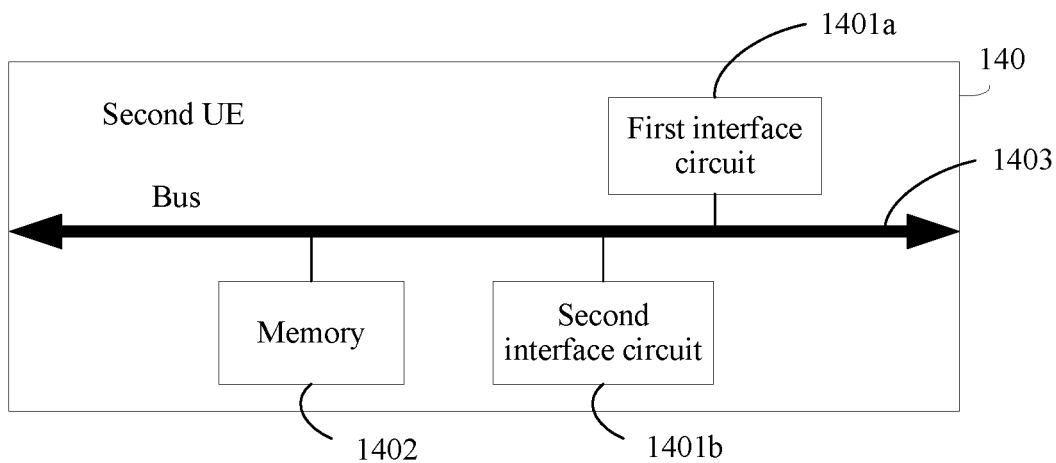
FIG. 14 is a second schematic structural diagram of second UE according to an embodiment of the present invention.

An embodiment of the present invention provides second UE 140. As shown in FIG. 14, the second UE 140 includes a first interface circuit 1401a, a second interface circuit 1401b, a memory 1402, and a bus 1403. The first interface circuit 1401a, the second interface circuit 1401b, and the memory 1402 are connected and complete mutual communication by using the bus 1403.

It should be noted that the memory 1402 herein may be one storage apparatus or may be a general term of a plurality of storage elements, and is configured to store executable program code or a parameter, data, and the like that are required for running an access network management device. In addition, the memory 1402 may include a RAM, or may include a non-volatile memory NVRAM, such as a disk memory or a flash memory (Flash).

The bus 1403 may be an ISA bus, a PCI bus, an EISA bus, or the like. The bus 1403 may be classified into an address bus, a data bus, a control bus, and the like. For ease of denotation, the bus 1403 is indicated by using only one bold line in FIG. 14; however, it does not indicate that there is only one bus or only one type of bus.

The first interface circuit 1401a is configured to send a first message to second UE 140, where the first message is used to request to allocate a resource to the second UE 140, the first UE is UE in a network coverage area of a base station, and the second UE 140 is UE out of the network coverage area of the base station.

The second interface circuit 1401b is configured to receive a second message sent by the first UE, where the second message carries resource indication information of a first resource allocated to the second UE 140.

The first interface circuit 1401a is further configured to send data to the first UE by using the first resource according to the resource indication information.

In a possible implementation, the first resource is allocated to the second UE after the first UE extends a pre-stored sidelink control information SCI format 0 according to the first message.

Specifically, for related descriptions of the SCI format 0 and specific descriptions of extending the pre-stored SCI format 0 by the first UE according to the first message, refer to the foregoing method embodiment, and details are not described in this embodiment of the present invention.

Preferably, the first resource has a fixed offset relative to a second resource indicated by the pre-stored SCI format 0.

In another possible implementation, the first resource is allocated by the base station to the second UE 140 after the first UE sends the first message to the base station.

Specifically, for the D2D resource allocation method performed by the second UE 140 provided in this embodiment of the present invention, refer to the foregoing method embodiment, and details are not described in this embodiment of the present invention.

This embodiment of the present invention provides the second UE, where the second UE is UE out of the network coverage area of the base station. In this embodiment of the present invention, after the second UE sends, to the first UE, the first message that is used to request to allocate a resource to the second UE, the first UE sends the second message to the second UE, where the second message carries the resource indication information of the first resource allocated to the second UE. In this way, after receiving the second message, the second UE may send the data to the first UE by using the first resource according to the resource indication information. The first UE is UE in the network coverage area of the base station. That is, by using the second UE provided in this embodiment of the present invention, resource allocation of a link from UE out of network coverage to UE in the network coverage can be implemented, so that a resource allocation problem of the link from the UE out of the network coverage to the UE in the network coverage is resolved.

Figure 15:
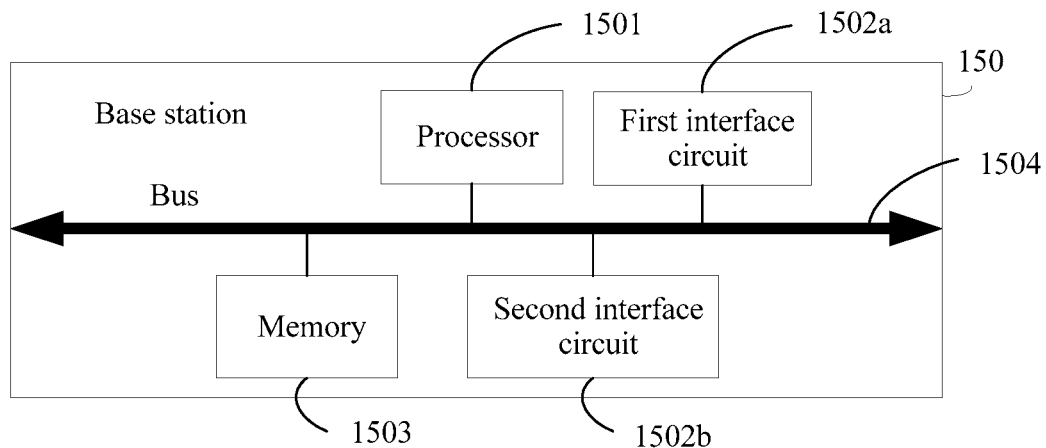
FIG. 15 is a second schematic structural diagram of a base station according to an embodiment of the present invention.

An embodiment of the present invention provides a base station 150. As shown in FIG. 15, the base station 150 includes a processor 1501, a first interface circuit 1502a, a second interface circuit 1502b, a memory 1503, and a bus 1504. The processor 1501, the first interface circuit 1502a, the second interface circuit 1502b, and the memory 1503 are connected and complete mutual communication by using the bus 1504.

It should be noted that the processor 1501 herein may be one processor, or may be a general term of a plurality of processing elements. For example, the processor 1501 may be a CPU, or may be an ASIC, or one or more integrated circuits configured to implement this embodiment of the present invention, such as one or more DSPs, or one or more FPGAs.

The memory 1503 may be one storage apparatus or may be a general term of a plurality of storage elements, and is configured to store executable program code or a parameter, data, and the like that are required for running an access network management device. In addition, the memory 1503 may include a RAM, or may include a non-volatile memory NVRAM, such as a disk memory or a flash memory (Flash).

The bus 1504 may be an ISA bus, a PCI bus, an EISA bus, or the like. The bus 1504 may be classified into an address bus, a data bus, a control bus, and the like. For ease of denotation, the bus 1504 is indicated by using only one bold line in FIG. 15; however, it does not indicate that there is only one bus or only one type of bus.

The first interface circuit 1502a is configured to receive a first message sent by first UE, where the first message is used to request to allocate a resource to the second UE, the first UE is UE in a network coverage area of the base station 150, and the second UE is UE out of the network coverage area of the base station 150.

The processor 1501 is configured to allocate a first resource to the second UE according to the first message.

The second interface circuit 1502b is configured to send a second message to the first UE, where the second message carries resource indication information of the first resource, and the first UE sends the resource indication information to the second UE.

Specifically, for the D2D resource allocation method performed by the base station 150 provided in this embodiment of the present invention, refer to the foregoing method embodiment, and details are not described in this embodiment of the present invention.

This embodiment of the present invention provides the base station. After receiving the first message that is sent by the first UE and that is used to request to allocate a resource to the second UE, the base station allocates the first resource to the second UE, and the base station sends the second message to the second UE by using the first UE, where the second message carries the resource indication information of the first resource. In this way, after receiving the second message, the second UE may send data to the first UE by using the first resource according to the resource indication information. The first UE is UE in the network coverage area of the base station, and the second UE is UE out of the network coverage area of the base station. That is, by using the base station provided in this embodiment of the present invention, resource allocation of a link from UE out of network coverage to UE in the network coverage can be implemented, so that a resource allocation problem of the link from the UE out of the network coverage to the UE in the network coverage is resolved.

In addition, an embodiment of the present invention further provides a computer readable medium (or media), including a computer readable instruction that performs the following operation when the instruction is executed: performing the operations in the method embodiments shown in FIG. 2 to FIG. 9 in the foregoing embodiments.

In addition, a computer program product is further provided, including the foregoing computer readable medium.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A device-to-device (D2D) resource allocation method, wherein the method comprises:
    receiving, by a first user equipment (UE), a first message sent by a second UE, wherein the first message is used to request to allocate a resource to the second UE, wherein the first UE is a UE in a network coverage area of a base station, and wherein the second UE is a UE out of the network coverage area of the base station;
    after receiving the first message, obtaining, by the first UE and according to the received first message, resource indication information of a first resource allocated to the second UE, wherein obtaining the resource indication information of the first resource allocated to the second UE comprises:
        extending, by the first UE and according to the received first message, a pre-stored sidelink control information (SCI) format 0 to obtain an extended SCI format 0, wherein the extended SCI format 0 is used to indicate the first resource allocated to the second UE, and wherein the pre-stored SCI format 0 includes a frequency hopping flag field, a resource block assignment and hopping resource allocation field, a time resource pattern field, a modulation and coding scheme (MCS) field, and a timing advance indication field; and
    sending, by the first UE, a second message to the second UE,
wherein the second message carries the resource indication information, and
wherein the second UE sends data to the first UE by the first resource according to the resource indication information.

2. The method according to claim 1, wherein the extending, by the first UE, a pre-stored SCI format 0 according to the first message comprises at least one of the following:
    increasing, by the first UE, the frequency hopping flag field in the pre-stored SCI format 0 by 1 bit, wherein the 1 bit is used to indicate whether a frequency hopping flag in the extended SCI format 0 is the same as a frequency hopping flag in the pre-stored SCI format 0;
    increasing, by the first UE, the resource block assignment and hopping resource allocation field in the pre-stored SCI format 0 by N bits, wherein the N bits are used to indicate an offset of the first resource on a frequency domain resource relative to a second resource indicated by the pre-stored SCI format 0, and wherein N is a positive integer;
    increasing, by the first UE, the time resource pattern field in the pre-stored SCI format 0 by M bits, wherein the M bits are used to indicate an offset of the first resource on a time domain resource relative to the second resource, and wherein M is a positive integer;
    increasing, by the first UE, the MCS field in the pre-stored SCI format 0 by Z bits, wherein the Z bits are used to indicate an offset of an MCS index of the first resource relative to an MCS index of the second resource, and wherein Z is a positive integer; or
    increasing, by the first UE, the timing advance indication field in the pre-stored SCI format 0 by 1 bit, wherein the 1 bit is used to indicate whether the second UE uses a timing advance indication of the second UE or uses a timing advance indication of the first UE.

3. The method according to claim 2, wherein the first resource has a fixed offset relative to the second resource indicated by the pre-stored SCI format 0.

4. The method according to claim 1, wherein the obtaining, by the first UE according to the first message, resource indication information of a first resource allocated to the second UE comprises:
sending, by the first UE, the first message to the base station; and
receiving, by the first UE, the second message sent by the base station, wherein the second message carries the resource indication information of the first resource allocated by the base station to the second UE.

5. A device-to-device (D2D) resource allocation method, wherein the method comprises:
sending, by a second user equipment (UE), a first message to a first UE, wherein the first message is used to request to allocate a resource to the second UE, wherein the first UE is a UE in a network coverage area of a base station, and wherein the second UE is a UE out of the network coverage area of the base station;
receiving, by the second UE, a second message sent by the first UE, wherein the second message carries resource indication information of a first resource allocated to the second UE, wherein the first resource is allocated to the second UE after the first UE extends a pre-stored sidelink control information (SCI) format 0 according to the first message, and wherein the pre-stored SCI format 0 includes a frequency hopping flag field, a resource block assignment and hopping resource allocation field, a time resource pattern field, a modulation and coding scheme (MCS) field, and a timing advance indication field; and
sending, by the second UE, data to the first UE by the first resource according to the resource indication information.

6. The method according to claim 5, wherein the first resource has a fixed offset relative to a second resource indicated by the pre-stored SCI format 0.

7. The method according to claim 5, wherein the first resource is allocated by the base station to the second UE after the first UE sends the first message to the base station.

8. A first user equipment (UE), wherein the first UE comprises at least one processor, a first interface circuit, a second interface circuit, a memory, and a bus, and the at least one processor, the first interface circuit, the second interface circuit, and the memory are connected and complete mutual communication by the bus, wherein:
the first interface circuit is configured to receive a first message sent by a second UE, wherein the first message is used to request to allocate a resource to the second UE, the first UE is a UE in a network coverage area of a base station, and the second UE is a UE out of the network coverage area of the base station;
the at least one processor is configured to obtain, according to the first message, resource indication information of a first resource allocated to the second UE, wherein obtaining the resource indication information of the first resource allocated to the second UE comprises:
extending, according to the first message, a pre-stored sidelink control information (SCI) format 0 to obtain an extended SCI format 0, wherein the extended SCI format 0 is used to indicate the first resource allocated to the second UE, and wherein the pre-stored SCI format 0 includes a frequency hopping flag field, a resource block assignment and hopping resource allocation field, a time resource pattern field, a modulation and coding scheme (MCS) field, and a timing advance indication field; and
the second interface circuit is configured to send a second message to the second UE, wherein the second message carries the resource indication information, and wherein the second UE sends data to the first UE by the first resource according to the resource indication information.

9. The first UE according to claim 8, wherein the at least one processor is configured to execute at least one of the following:
increasing the frequency hopping flag field in the pre-stored SCI format 0 by 1bit, wherein the 1bit is used to indicate whether a frequency hopping flag in the extended SCI format 0 is the same as a frequency hopping flag in the pre-stored SCI format 0;
increasing the resource block assignment and hopping resource allocation field in the pre-stored SCI format 0 by N bits, wherein the N bits are used to indicate an offset of the first resource on a frequency domain resource relative to a second resource indicated by the pre-stored SCI format 0, and wherein N is a positive integer;
increasing the time resource pattern field in the pre-stored SCI format 0 by M bits, wherein the M bits are used to indicate an offset of the first resource on a time domain resource relative to the second resource, and wherein M is a positive integer;
increasing the MCS field in the pre-stored SCI format 0 by Z bits, wherein the Z bits are used to indicate an offset of an MCS index of the first resource relative to an MCS index of the second resource, and wherein Z is a positive integer; or
increasing the timing advance indication field in the pre-stored SCI format 0 by 1bit, wherein the 1bit is used to indicate whether the second UE uses a timing advance indication of the second UE or uses a timing advance indication of the first UE.

10. The first UE according to claim 9, wherein the first resource has a fixed offset relative to the second resource indicated by the pre-stored SCI format 0.

11. The first UE according to claim 8, wherein the at least one processor is configured to:
send the first message to the base station by the second interface circuit; and
receive, by the first interface circuit, the second message sent by the base station, wherein the second message carries the resource indication information of the first resource allocated by the base station to the second UE.

* * * * *

UNITED STATES PATENT AND TRADEMARK OFFICE
CERTIFICATE OF CORRECTION

PATENT NO. : 10,548,125 B2  
APPLICATION NO. : 15/760134  
DATED : January 28, 2020  
INVENTOR(S) : Kai Xu and Xiaocui Li Page 1 of 1

It is certified that error appears in the above-identified patent and that said Letters Patent is hereby corrected as shown below:

On the Title Page

In Column 2, item (56), Line 3, delete "10-14," and insert -- 10th-14th, --, therefor.

In the Claims

In Column 28, Line 42, in Claim 2, delete "1bit," and insert -- 1 bit, --, therefor.

In Column 28, Line 43, in Claim 2, delete "1bit" and insert -- 1 bit --, therefor.

In Column 28, Line 64, in Claim 2, delete "1bit" and insert -- 1 bit --, therefor.

In Column 28, Line 65, in Claim 2, delete "1bit" and insert -- 1 bit --, therefor.

In Column 30, Line 22, in Claim 9, delete "1bit" and insert -- 1 bit --, therefor.

In Column 30, Line 22, in Claim 9, delete "1bit" and insert -- 1 bit --, therefor.

In Column 30, Line 44, in Claim 9, delete "1bit" and insert -- 1 bit --, therefor.

In Column 30, Line 44, in Claim 9, delete "1bit" and insert -- 1 bit --, therefor.

Signed and Sealed this  
Twenty-fourth Day of March, 2020

Andrei Iancu  
*Director of the United States Patent and Trademark Office*